United States Patent
Kim et al.

(10) Patent No.: US 9,929,644 B2
(45) Date of Patent: Mar. 27, 2018

(54) INTERNAL VOLTAGE TRIMMING DEVICE AND SEMICONDUCTOR INTEGRATED CIRCUIT INCLUDING THE SAME

(71) Applicant: SAMSUNG ELECTRONICS CO., LTD., Suwon-si (KR)

(72) Inventors: Ji-sung Kim, Seoul (KR); Se-eun Oh, Suwon-si (KR); Jun-young Park, Suwon-si (KR); Hyeon-seong Im, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/221,902

(22) Filed: Jul. 28, 2016

(65) Prior Publication Data

US 2017/0054372 A1   Feb. 23, 2017

(30) Foreign Application Priority Data

Aug. 20, 2015  (KR) .......................... 10-2015-0117337

(51) Int. Cl.
*H02M 3/07* (2006.01)
*H02M 1/00* (2006.01)

(52) U.S. Cl.
CPC .............. *H02M 3/07* (2013.01); *H02M 3/073* (2013.01); *H02M 2001/0025* (2013.01)

(58) Field of Classification Search
CPC ................................ G05F 1/465; G05F 1/468; H02M 2001/0025; H02M 3/07; H02M 2003/072;

(Continued)

(56) References Cited

U.S. PATENT DOCUMENTS 5,596,297 A  *  1/1997  McClure ................. G05F 3/262
327/530
6,674,318 B2      1/2004  Kanda et al.

(Continued)

FOREIGN PATENT DOCUMENTS

JP       2002-343868 A    11/2002
KR  10-2006-0054568 A     5/2006

(Continued)

OTHER PUBLICATIONS

Hiroyuki Tanikawa et al., "An Internal Voltage Generation System of Flash Memory Module Embedded in a Microcontroller", 2005, 4 pages total, IEEE, Tokyo, JP.

*Primary Examiner* — Fred E Finch, III
(74) *Attorney, Agent, or Firm* — Sughrue Mion, PLLC

(57) ABSTRACT

An internal voltage trimming device and a semiconductor integrated circuit including the same are provided. The internal voltage trimming device includes a voltage dividing circuit configured to generate a feedback voltage based on a resistance of the voltage dividing circuit and a target voltage that is received in a trimming mode, and a comparator configured to compare a reference voltage and the feedback voltage to generate a comparison signal. The internal voltage trimming device further includes a direct current to direct current (DC-DC) converter configured to generate an internal voltage based on an input voltage and the comparison signal, and be disabled in the trimming mode, and an automatic trimming circuit configured to generate, in the trimming mode, a trimming signal based on the comparison signal. The voltage dividing circuit is further configured to adjust the resistance based on the trimming signal.

18 Claims, 16 Drawing Sheets

(58) Field of Classification Search
CPC . H02M 3/073; H02M 2003/075; H02M 3/156
See application file for complete search history.

(56) References Cited

U.S. PATENT DOCUMENTS

| | | |
|---|---|---|
| 6,826,103 B2 | 11/2004 | Moon et al. |
| 6,909,642 B2 | 6/2005 | Lehmann et al. |
| 7,277,350 B2 | 10/2007 | Huckaby et al. |
| 7,359,255 B2 | 4/2008 | Kimura et al. |
| 8,350,617 B2 | 1/2013 | Ryu et al. |
| 8,498,173 B2 | 7/2013 | Seki et al. |
| 2007/0210853 A1* | 9/2007 | Maejima ................ G11O 5/145 327/536 |
| 2014/0077787 A1* | 3/2014 | Gorisse ................ H03F 1/0211 323/304 |
| 2014/0197807 A1* | 7/2014 | Tercariol ................ G05F 1/46 323/234 |
| 2015/0029806 A1* | 1/2015 | Qiao ...................... G11O 5/147 365/226 |
| 2016/0231757 A1* | 8/2016 | Lim ........................ G05F 1/468 |

FOREIGN PATENT DOCUMENTS

| | | |
|---|---|---|
| KR | 10-0812299 B1 | 3/2008 |
| KR | 10-2012-0122583 A | 11/2012 |

* cited by examiner

INTERNAL VOLTAGE TRIMMING DEVICE AND SEMICONDUCTOR INTEGRATED CIRCUIT INCLUDING THE SAME

CROSS-REFERENCE TO RELATED APPLICATION

This application claims priority from Korean Patent Application No. 10-2015-0117337, filed on Aug. 20, 2015 in the Korean Intellectual Property Office, the disclosure of which is incorporated herein by reference in its entirety.

BACKGROUND

1. Field

Apparatuses and methods consistent with exemplary embodiments relate to a voltage trimming device of a semiconductor integrated circuit and an operating method thereof, and more particularly, to an internal voltage trimming device and a semiconductor integrated circuit including the same.

2. Description of the Related Art

When a voltage for a semiconductor integrated circuit is generated in a chip, a trimming operation is performed to maintain an internal voltage within a designed range. The size of the chip increases due to a trimming circuit added to the semiconductor integrated circuit for trimming the internal voltage. Furthermore, due to the amount of time used for trimming the internal voltage, a productivity of a test process may be reduced. Therefore, research in designing a trimming device capable of trimming an internal voltage while reducing trimming time and minimizing any increase in size of the chip is being conducted.

SUMMARY

Exemplary embodiments may address at least the above problems and/or disadvantages and other disadvantages not described above. Also, the exemplary embodiments are not required to overcome the disadvantages described above, and may not overcome any of the problems described above.

One or more exemplary embodiments provide an internal voltage trimming device for performing a quick and precise trimming operation while minimizing increase in a size of a chip.

One or more exemplary embodiments provide a semiconductor integrated circuit including an internal voltage trimming device for performing a quick and precise trimming operation while minimizing increase in a size of a chip.

According to an aspect of an exemplary embodiment, there is provided an internal voltage trimming device including an internal voltage trimming device including a voltage dividing circuit configured to generate a feedback voltage based on a voltage dividing ratio of the voltage dividing circuit and a target voltage of an output pad, the voltage dividing circuit including resistance devices that are configured to set the voltage dividing ratio, and a comparator configured to compare a reference voltage and the feedback voltage, and generate a comparison signal based on the comparison. The internal voltage trimming device further includes a direct current to direct current (DC-DC) converter configured to generate an internal voltage based on an input voltage and the comparison signal, and output the internal voltage to the output pad, and an automatic trimming circuit configured to generate, in a trimming mode, a trimming signal for reducing a difference between the reference voltage and the feedback voltage, based on the comparison signal. In the trimming mode, the DC-DC converter is further configured to be disabled, the target voltage is applied to the output pad, and the voltage dividing circuit is further configured to adjust the voltage dividing ratio based on the trimming signal.

In the trimming mode, the target voltage may be generated and applied to the output pad by an external tester.

The comparator may include a first input terminal configured to receive the reference voltage, a second input terminal connected to a feedback node, the second input terminal being configured to receive the feedback voltage, and an operation amplifier configured to generate the comparison signal based on a voltage difference between the first input terminal and the second input terminal.

The resistance devices of the voltage dividing circuit are connected in a serial string between the output pad and a ground terminal, and the voltage dividing circuit further includes switches respectively connected between nodes of the serial string and a feedback node, the switches being configured to be turned on based on the trimming signal.

The resistance devices of the voltage dividing circuit are connected in a serial string between the output pad and a ground terminal, and the voltage dividing circuit further includes a switch connected to one among the resistance devices in parallel, the switch being configured to be turned on based on the trimming signal.

The DC-DC converter may be further configured to set the internal voltage to be lower or higher than the input voltage based on the comparison signal.

The DC-DC converter may include an oscillator configured to generate a pulse signal, and change at least one among a frequency and a duty cycle of the pulse signal based on the comparison signal, and a voltage pump circuit configured to boost the input voltage in response to the pulse signal to generate the internal voltage.

The automatic trimming circuit may be further configured to determine a final voltage dividing ratio of the voltage dividing circuit to be the voltage dividing ratio corresponding to the trimming signal in response to a change in a logic state of the comparison signal.

The automatic trimming circuit may include a logical circuit configured to generate the trimming signal based on a logic state of the comparison signal, and a trimming determiner configured to determine a final voltage dividing ratio of the voltage dividing circuit to be the voltage dividing ratio corresponding to the trimming signal in response to the comparison signal changing from a first logic state to a second logic state.

The trimming determiner may be further configured to determine the final voltage dividing ratio to be a voltage dividing ratio corresponding to an (N−1)th trimming signal in response to the comparison signal changing from the second logic state to the first logic state, the trimming signal being an Nth trimming signal, and N being an integer of one or more.

The internal voltage trimming device may further include a verifier configured to, in a verification mode block the target voltage applied to the output pad, and determine at least one among the voltage dividing circuit, the comparator, and the DC-DC converter as defective in response to a change in a logical state of the comparison signal not occurring during an initial set time period during which the DC-DC converter is enabled.

According to an aspect of another exemplary embodiment, there is provided a semiconductor integrated circuit including an internal voltage generating circuit configured to generate, using a comparator, a comparison signal based on a difference between a reference voltage and a feedback voltage that is received from an output pad via a voltage dividing circuit, generate, using a direct current to direct current (DC-DC) converter, an internal voltage based on the comparison signal, and output the internal voltage to the output pad. The semiconductor integrated circuit further includes an automatic trimming circuit configured to generate a trimming signal for adjusting a voltage dividing ratio of the voltage dividing circuit to reduce the difference between the reference voltage and the feedback voltage, based on the comparison signal, and a processor configured to enable the automatic trimming circuit and disable the DC-DC converter in a trimming mode, and enable the DC-DC converter and disable the automatic trimming circuit in an operating mode. The semiconductor integrated circuit applies a target voltage to the output pad in the trimming mode.

The voltage dividing circuit may include a serial string of resistance devices connected between the output pad and a ground terminal, and switches respectively connected between nodes of the serial string and a feedback node, the switches being configured to be turned on based on the trimming signal. The comparator may include a first input terminal configured to receive the reference voltage, a second input terminal connected to a feedback node, the second input terminal being configured to receive the feedback voltage, and an operation amplifier configured to generate the comparison signal based on a voltage difference between the first input terminal and the second input terminal.

The automatic trimming circuit may be further configured to determine a final voltage dividing ratio of the voltage dividing circuit to be the voltage dividing ratio corresponding to the trimming signal in response to the comparison signal changing from a first logic state to a second logic state, and determine the final voltage dividing ratio to be a voltage dividing ratio corresponding to an (N−1)th trimming signal in response to the comparison signal changing from the second logic state to the first logic state, the trimming signal being an Nth trimming signal, and N being an integer of one or more.

The processor may be further configured to enable the DC-DC converter and disable the automatic trimming circuit in a verification mode, and detect whether the internal voltage generating circuit is defective based on a change in a logic state of the comparison signal in the verification mode.

The processor may be further configured to determine the internal voltage generating circuit as defective in response to the change in the logical state of the comparison signal not occurring in the verification mode during an initial set time period.

The automatic trimming circuit may be further configured to determine a final voltage dividing ratio of the voltage dividing circuit to be the voltage dividing ratio corresponding to the trimming signal in response to a change in a logic state of the comparison signal.

According to an aspect of another exemplary embodiment, there is provided an internal voltage trimming device including a voltage dividing circuit configured to generate a feedback voltage based on a resistance of the voltage dividing circuit and a target voltage that is received in a trimming mode, and a comparator configured to compare a reference voltage and the feedback voltage to generate a comparison signal. The internal voltage trimming device further includes a direct current to direct current (DC-DC) converter configured to generate an internal voltage based on an input voltage and the comparison signal, and be disabled in the trimming mode, and an automatic trimming circuit configured to generate, in the trimming mode, a trimming signal based on the comparison signal. The voltage dividing circuit is further configured to adjust the resistance based on the trimming signal.

The automatic trimming circuit may be further configured to generate the trimming signal to decrease the resistance in response to the comparison signal indicating that the reference voltage is lower than the feedback voltage.

The automatic trimming circuit may be further configured to generate the trimming signal to increase the resistance in response to the comparison signal indicating that the reference voltage is higher than the feedback voltage.

BRIEF DESCRIPTION OF THE DRAWINGS

The above and/or other aspects will be more apparent by describing exemplary embodiments with reference to the accompanying drawings, in which.

DETAILED DESCRIPTION OF THE EXEMPLARY EMBODIMENTS

Figure 1:
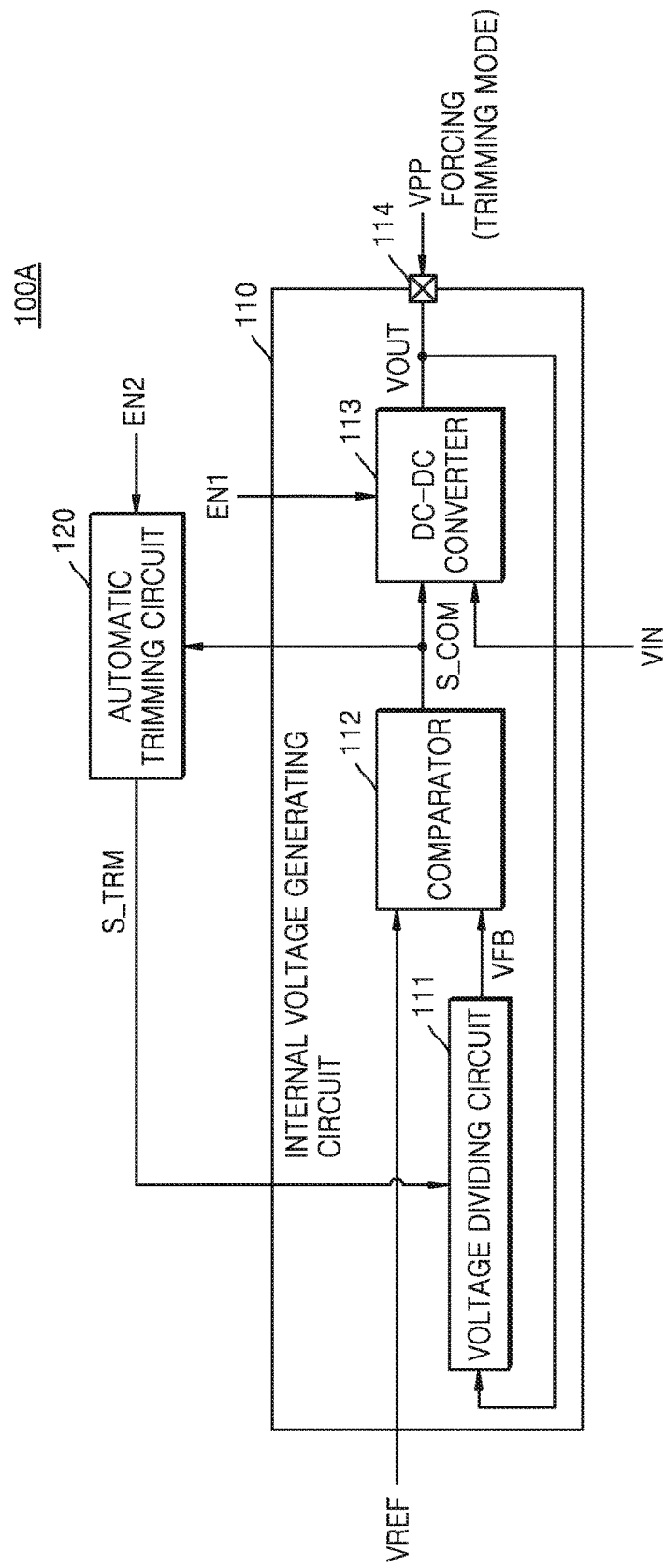
FIG. 1 is a configuration diagram of an internal voltage trimming device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "includes", "including", "comprises" and/or "comprising" used herein specify the presence of stated features or components, but do not preclude the presence or addition of one or more other features or components. In addition, the terms such as "circuit", "unit," "-er (-or)," and "module" described in the specification refer to an element for performing at least one function or operation, and may be implemented in hardware, software, or the combination of hardware and software.

FIG. 1 is a configuration diagram of an internal voltage trimming device 100A according to an exemplary embodiment.

Referring to FIG. 1, the internal voltage trimming device 100A includes an internal voltage generating circuit 110 and an automatic trimming circuit 120. Furthermore, the internal voltage generating circuit 110 includes a voltage dividing circuit 111, a comparator 112, a DC-DC (direct current to direct current) converter 113, and an output pad 114.

The internal voltage generating circuit 110 generates an internal voltage VOUT and adjusts the internal voltage VOUT to a voltage level for a semiconductor integrated circuit. The internal voltage VOUT output from the internal voltage generating circuit 110 is to remain stable at a target level. However, the internal voltage VOUT output by the internal voltage generating circuit 110 may change due to an environmental condition of a semiconductor manufacturing process or a process variation. Therefore, a trimming operation is performed for adjusting the internal voltage VOUT to the target level.

In detail, the voltage dividing circuit 111 generates a feedback voltage VFB equal to a voltage of the output pad 114 multiplied by a voltage dividing ratio determined based on a plurality of resistance devices, and applies the feedback voltage VFB to one among the input terminals of the comparator 112. The voltage dividing ratio may be determined based on resistance values of the plurality of resistance devices. Furthermore, the voltage dividing ratio in a trimming mode may be adjusted by a trimming signal S_TRM input from the automatic trimming circuit 120.

The feedback voltage VFB output from the voltage dividing circuit 111 is applied to one among the input terminals of the comparator 112, and a reference voltage VREF is applied to the other input terminal. The comparator 112 generates a comparison signal S_COM based on the comparison of the reference voltage VREF and the feedback voltage VFB. For example, a comparison signal S_COM in a first logic state may be generated when the reference voltage VREF is higher than the feedback voltage VFB, and a comparison signal S_COM in a second logic state may be generated when the reference voltage VREF is lower than the feedback voltage VFB.

The DC-DC converter 113 generates the internal voltage VOUT from an input voltage VIN based on the comparison signal S_COM input from the comparator 112, and outputs the internal voltage VOUT to the output pad 114. The DC-DC converter 113 operates such that the internal voltage VOUT is increased when the comparison signal S_COM output from the comparator 112 is in the first logic state. Furthermore, the DC-DC converter 113 operates such that the internal voltage VOUT is decreased when the comparison signal S_COM output from the comparator 112 is in the second logic state. Accordingly, the internal voltage VOUT output from the DC-DC converter 113 is increased or decreased according to the target level.

Based on the comparison signal S_COM, the DC-DC converter 113 may act as a step-up DC-DC converter or a step-down DC-DC converter. For example, based on the comparison signal S_COM, an internal voltage VOUT generated by the DC-DC converter 113 may be higher than or lower than an input voltage VIN.

Next, the comparison signal S_COM generated by the comparator 112 of the internal voltage generating circuit 110 is output to the automatic trimming circuit 120, and the automatic trimming circuit 120 generates a trimming signal S_TRM for adjusting the voltage dividing ratio of the voltage dividing circuit 111 to reduce a difference between the reference voltage VREF and the feedback voltage VFB. The automatic trimming circuit 120 determines a trimming set value when a logic state of the comparison signal S_COM changes, and then completes the trimming operation.

For example, the automatic trimming circuit 120 may determine the final adjustment value as a trimming set value set according to the trimming signal S_TRM when the comparison signal S_COM changes from the first logic state to the second logic state, or may determine the final adjustment value as a trimming set value set according to an Nth (N is an integer of one or more) trimming signal S_TRM when the comparison signal S_COM changes from the second logic state to the first logic state.

The internal voltage trimming device 100A may be operated in an operating mode and a trimming mode.

In the operating mode, the automatic trimming circuit 120 is disabled and the voltage dividing circuit 111, the comparator 112, and the DC-DC converter 113 are enabled. In other words, in the operating mode, a first enable signal EN1 in a logic state for activating the DC-DC converter 113 may be applied to the DC-DC converter 113, and a second enable signal EN2 in a logic state for activating the automatic trimming circuit 120 may not be applied to the automatic trimming circuit 120. For example, the first and second enable signals EN1 and EN2 may be provided from a processor of the semiconductor integrated circuit to which the internal voltage trimming device 100A is applied. In the operating mode, a target voltage VPP may not be applied to the output pad 114 from outside.

In the trimming mode, the DC-DC converter 113 of the internal voltage generating circuit 110 may be disabled and the automatic trimming circuit 120 may be enabled. In other words, in the trimming mode, the second enable signal EN2 in a logic state for activating the automatic trimming circuit 120 may be applied to the automatic trimming circuit 120, and the first enable signal EN1 in a logic state for activating the DC-DC converter 113 may not be applied to the DC-DC converter 113. Furthermore, in the trimming mode, the automatic trimming circuit 120 performs an automatic trimming operation by using the comparison signal S_COM output from the comparator 112 of the internal voltage generating circuit 110 while the target voltage VPP is applied to the output pad 114 from outside. The automatic trimming operation performed during the trimming mode will be described below in detail.

Figure 2:
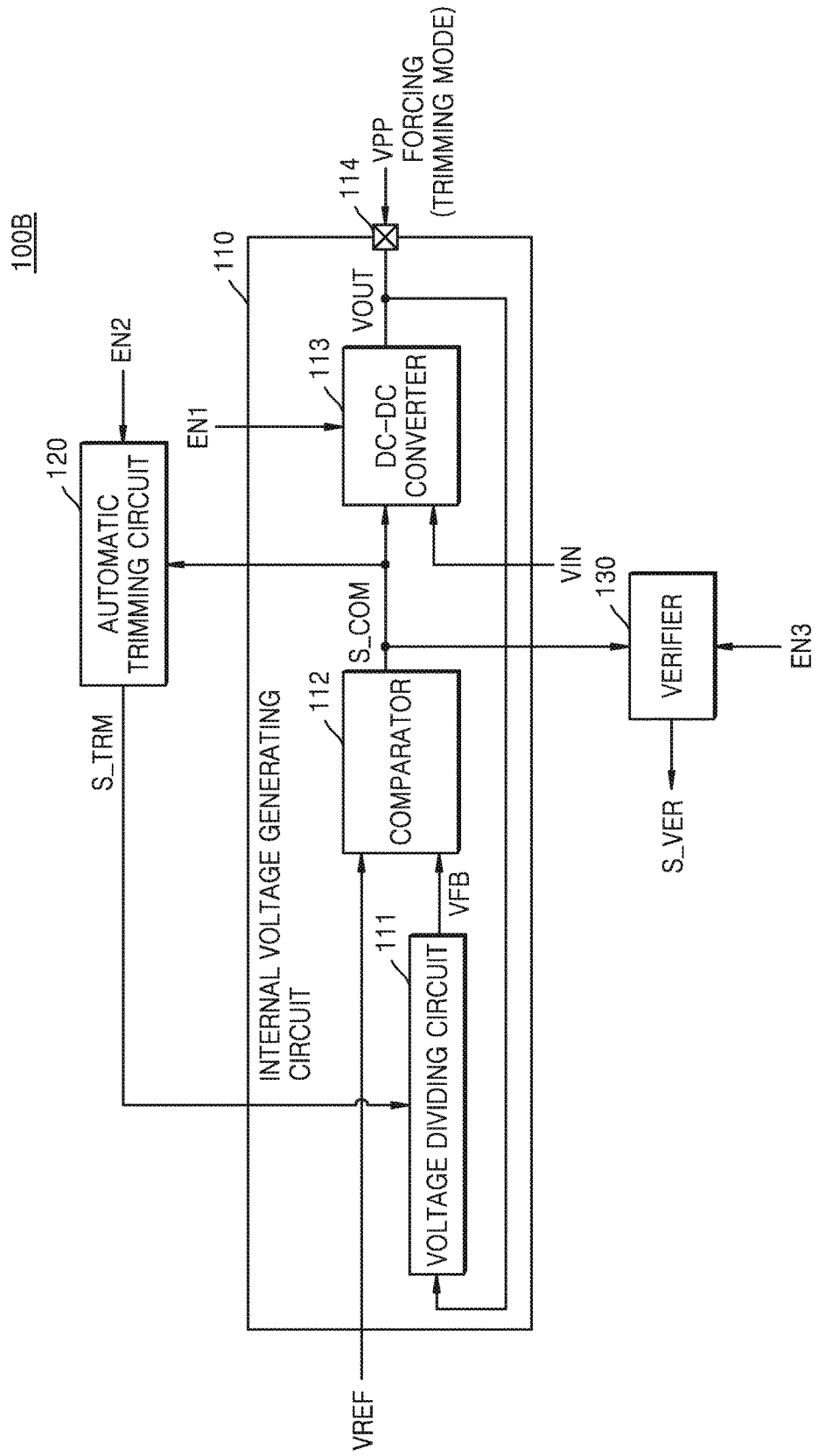
FIG. 2 is a configuration diagram of an internal voltage trimming device according to another exemplary embodiment.

FIG. 2 is a configuration diagram of an internal voltage trimming device 100B according to another exemplary embodiment.

Referring to FIG. 2, the internal voltage trimming device 100B includes an internal voltage generating circuit 110, an automatic trimming circuit 120, and a verifier 130.

Because the internal voltage generating circuit 110 and the automatic trimming circuit 120 in the internal voltage trimming device 100B of FIG. 2 are substantially the same as the internal voltage generating circuit 110 and the automatic trimming circuit 120 in the internal voltage trimming device 100A of FIG. 1, repeated descriptions of the above exemplary embodiments are omitted.

The internal voltage trimming device 100B may be operated according to an operating mode, a trimming mode, and a verification mode.

In the operating mode, the automatic trimming circuit 120 and the verifier 130 are disabled, and the voltage dividing circuit 111, the comparator 112, and the DC-DC converter 113 are enabled. In other words, in the operating mode, a first enable signal EN1 in a logic state for activating the DC-DC converter 113 may be applied to the DC-DC converter 113, a second enable signal EN2 in a logic state for activating the automatic trimming circuit 120 may not be applied to the automatic trimming circuit 120, and a third enable signal EN3 in a logic state for activating the verifier 130 may not be applied to the verifier 130.

In the trimming mode, the DC-DC converter 113 of the internal voltage generating circuit 110 and the verifier 130 are respectively disabled, and the automatic trimming circuit 120 is enabled. In other words, in the trimming mode, the second enable signal EN2 in a logic state for activating the automatic trimming circuit 120 may be applied to the automatic trimming circuit 120. However, the first enable signal EN1 in a logic state for activating the DC-DC converter 113 and the third enable signal EN3 in a logic state for activating the verifier 130 are not applied to the DC-DC converter 113 and the verifier 130, respectively. Furthermore, in the trimming mode, the automatic trimming circuit 120 performs an automatic trimming operation by using the comparison signal S_COM output from the comparator 112 of the internal voltage generating circuit 110 while the target voltage VPP is applied to the output pad 114 from outside.

In the verification mode, the verifier 130 is enabled and the automatic trimming circuit 120 is disabled. Furthermore, the voltage dividing circuit 111, the comparator 112, and the DC-DC converter 113 are enabled. In other words, in the verification mode, the first enable signal EN1 in a logic state for activating the DC-DC converter 113 may be applied to the DC-DC converter 113, and the third enable signal EN3 in a logic state for activating the verifier 130 may be applied to the verifier 130. However, the second enable signal EN2 in a logic state for activating the automatic trimming circuit 120 may not be applied to the automatic trimming circuit 120.

For example, the first to third enable signals EN1 to EN3 may be provided from a processor of a semiconductor integrated circuit to which the internal voltage trimming device 100B is applied.

The verifier 130 monitors the comparison signal S_COM input from the comparator 112 in the verification mode, and may determine the comparison signal S_COM as defective when a change in a logical state of the comparison signal S_COM does not occur during an initial set time period. Furthermore, the verifier 130 may determine the comparison signal S_COM as non-defective when a change in a logic state of the comparison signal S_COM occurs during the initial set time period. The verifier 130 generates a verification signal S_VER representing a determination result according to the verifying operation as described above.

Figure 3:
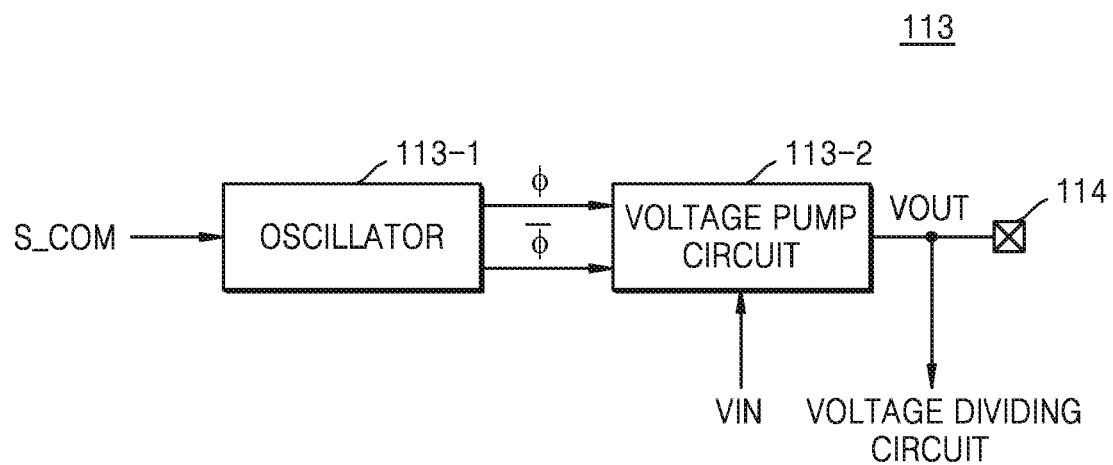
FIG. 3 is a configuration diagram of a DC-DC (direct current to direct current) converter illustrated in FIGS. 1 and 2.

FIG. 3 is a configuration diagram of the DC-DC converter 113 illustrated in FIGS. 1 and 2.

The DC-DC converter 113 illustrated in FIG. 3 is an example of a step-up DC-DC converter.

Referring to FIG. 3, the DC-DC converter 113 includes an oscillator 113-1 and a voltage pump circuit 113-2.

The oscillator 113-1 generates a pulse signal, in which the oscillator changes at least one among frequency and duty cycle of the pulse signal according to a comparison signal S_COM input from the comparator 112. The phase difference between pulse signals ø and $\overline{ø}$ output from the oscillator 113-1 is 180 degrees.

For example, the comparison signal S_COM in the first logic state is input to the oscillator 113-1 when the reference voltage VREF is higher than the feedback voltage VFB, and the comparison signal S_COM in the second logic state is input to the oscillator 113-1 when the reference voltage VREF is lower than the feedback voltage VFB. In this case, the oscillator 113-1 outputs a pulse signal when the comparison signal S_COM is in the first logic state, and shuts off the pulse signal output when the comparison signal S_COM is in the second logic state. That is, the comparison signal S_COM in the first logic state may be used as an enable signal of the oscillator 113-1, and the comparison signal S_COM in the second logic state may be used as a disable signal of the oscillator 113-1. As described above, frequency or duty of the pulse signals ø and $\overline{ø}$ that are output to the voltage pump circuit 113-2 changes according to a change in a logic state of the comparison signal S_COM.

The voltage pump circuit 113-2 may perform a charge pumping operation in response to the pulse signals ø and $\overline{ø}$ input from the oscillator 113-1. In the charge pumping operation, the voltage pump circuit 113-2 may boost the input voltage VIN and generate the internal voltage VOUT.

Figure 4:
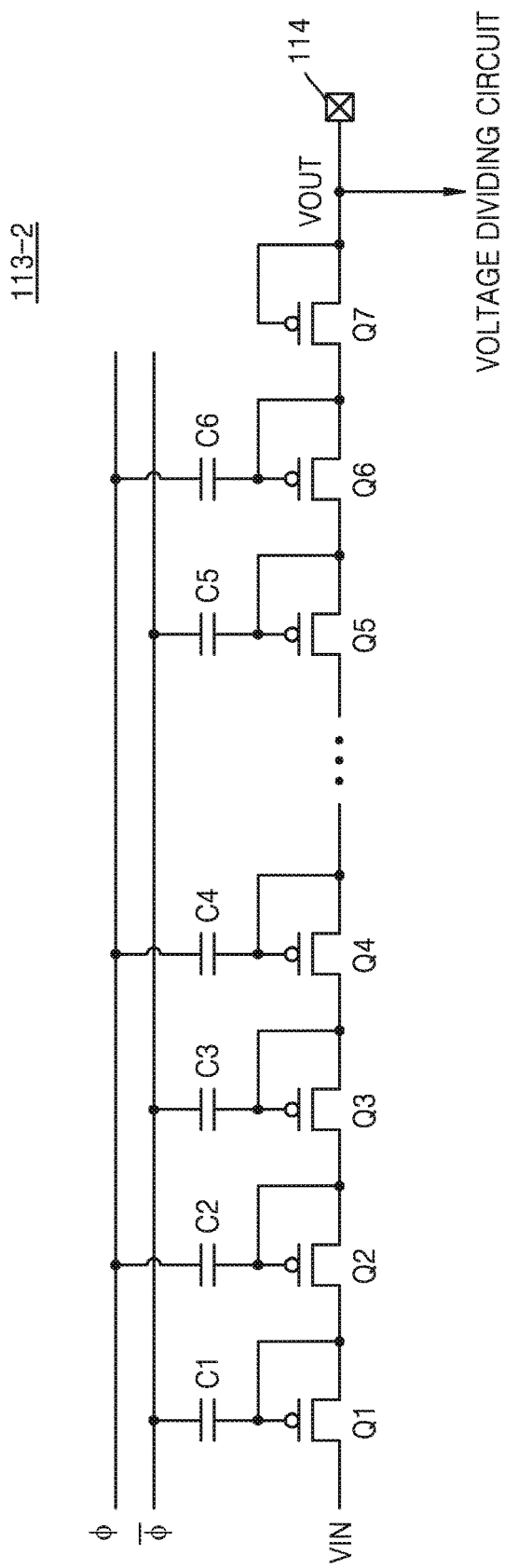
FIG. 4 is a configuration diagram of a voltage pump circuit illustrated in FIG. 3.

FIG. 4 is a configuration diagram of the voltage pump circuit 113-2 illustrated in FIG. 3.

Referring to FIG. 4, the voltage pump circuit 113-2 includes a plurality of PMOS transistors Q1 to Q7 and a plurality of capacitors C1 to C6. A group of capacitors C2, C4, and C6 is connected to the signal line transmitting the pulse signal ø, and another group of capacitors C1, C3, and C5 is connected to the signal line transmitting the pulse signal $\overline{ø}$.

In detail, a first terminal of the PMOS transistor Q1 is connected to the input voltage VIN, and a gate terminal and a second terminal of the PMOS transistor Q1 are connected to each other. Furthermore, a capacitor C1 is connected between the gate terminal of the PMOS transistor Q1 and the signal line transmitting the pulse signal $\overline{ø}$.

Next, a first terminal of the PMOS transistor Q2 is connected to the gate terminal and the second terminal of the PMOS transistor Q1, and a gate terminal and a second terminal of the PMOS transistor Q2 are connected to each other. Moreover, a capacitor C2 is connected between the gate terminal of the PMOS transistor Q2 and the signal line transmitting the pulse signal ø.

According to the above method, the PMOS transistors Q3 to Q6 and the capacitors C3 to C6 are connected to each other as in FIG. 4. Furthermore, a first terminal of the PMOS transistor Q7 is connected to a gate terminal and a second terminal of the PMOS transistor Q6, and a gate terminal and the second terminal of the PMOS transistor Q7 are connected to each other. The internal voltage VOUT is output to a second terminal of the PMOS transistor Q7.

When the PMOS transistor Q1 is turned on by the pulse signal $\bar{\varnothing}$, a voltage applied to the second terminal of the PMOS transistor Q1 is precharged to a voltage VIN-Vth equal to an input voltage VIN minus a threshold voltage Vth. When the voltage VIN-Vth is applied to the second terminal of the PMOS transistor Q1, a charge pump operation in response to the pulse signal $\bar{\varnothing}$ is performed in which the capacitor C1 charges to the voltage VIN-Vth.

When the PMOS transistor Q2 is turned on by the pulse signal ø, a voltage applied to the second terminal of the PMOS transistor Q2 is precharged to a voltage 2VIN-2Vth equal to a voltage 2VIN minus a threshold voltage 2Vth, and boosted by the capacitor C1. When the voltage 2VIN-2Vth is applied to the second terminal of the PMOS transistor Q2, a charge pump operation in response to the pulse signal ø is performed in which the capacitor C2 charges to the voltage 2VIN-2Vth.

By sequentially performing the operation of the charge pump by the above method, the internal voltage VOUT boosted by the charge pump to the second terminal of the PMOS transistor Q7 is output.

Figure 5:
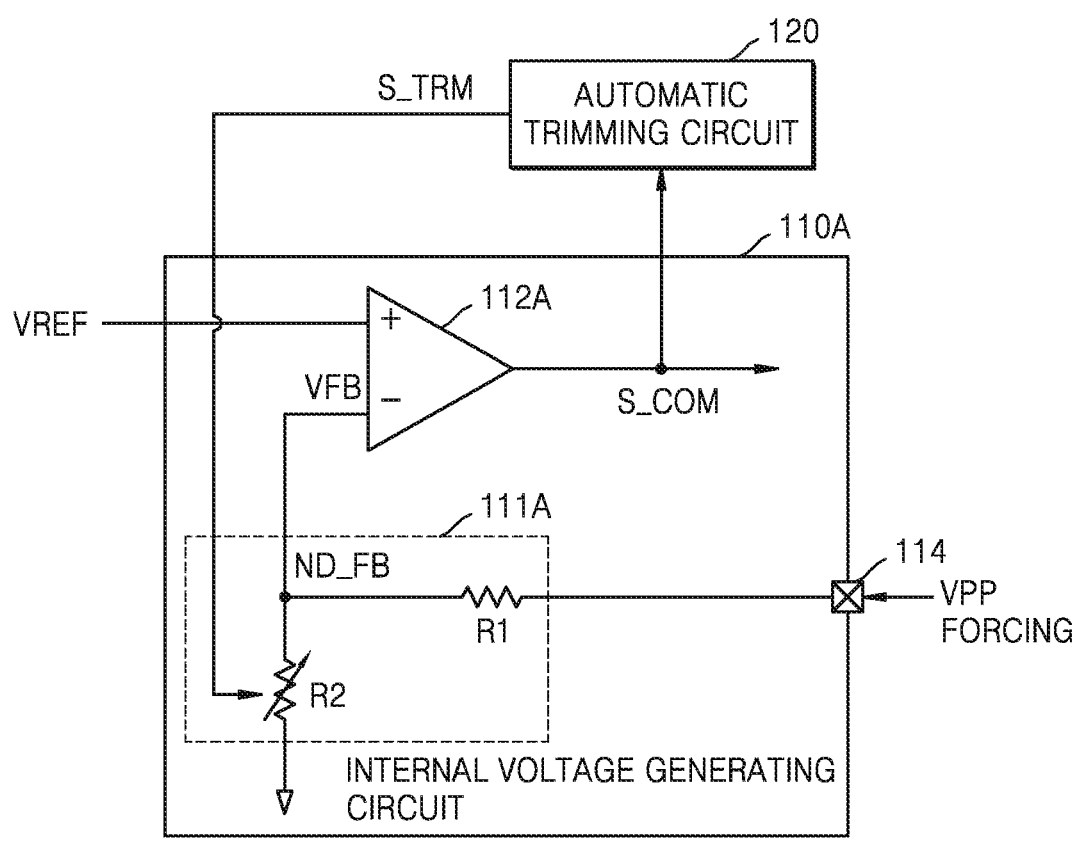
FIG. 5 is a configuration diagram of a circuit for explaining operations of the internal voltage trimming devices of FIGS. 1 and 2, in the trimming mode.

FIG. 5 is a configuration diagram of a circuit for explaining operations of the internal voltage trimming devices 100A and 100B of FIGS. 1 and 2, in a trimming mode.

In the internal voltage trimming device 100A illustrated in FIG. 1, in a trimming mode, the DC-DC converter 113 of the internal voltage generating circuit 110 is disabled and the automatic trimming circuit 120 is enabled. Furthermore, the voltage dividing circuit 111 and the comparator 112 of the internal voltage generating circuit 110 are enabled.

In the internal voltage trimming device 100B illustrated in FIG. 2, in a trimming mode, the DC-DC converter 113 of the internal voltage generating circuit 110 is disabled, the verifier 130 is disabled, and the automatic trimming circuit 120 is enabled. Furthermore, the voltage dividing circuit 111 and the comparator 112 of the internal voltage generating circuit 110 are enabled.

In the internal voltage trimming device 100A of FIG. 1, a circuit equivalent to the circuit in FIG. 5 in which the DC-DC converter 113 is disabled during a trimming mode may be applied. By the same method, in the internal voltage trimming device 100B of FIG. 2, a circuit equivalent to the circuit in FIG. 5 in which the DC-DC converter 113 and the verifier 130 are disabled during a trimming mode may also be applied.

In FIG. 5, an internal voltage generating circuit 110A includes a voltage dividing circuit 111A and a comparator 112A. The voltage dividing circuit 111A includes a plurality of resistance devices R1 and R2, and a comparator 112A is an operational amplifier. The operations of FIG. 5 in the trimming mode will be explained.

In the trimming mode, a target voltage VPP is forced to an output pad 114 from outside.

The target voltage VPP applied to the output pad 114 is divided by the resistance devices R1 and R2 of the voltage dividing circuit 111A, resulting in a feedback voltage VFB at a feedback node ND_FB. A voltage dividing ratio of the voltage dividing circuit 111A is determined by resistance values of the resistance devices R1 and R2. The resistance values of the resistance devices R1 and R2 may be set to an initial set value before performing the trimming mode.

A reference voltage VREF and a feedback voltage VFB are respectively applied to two input terminals of the comparator 112A. FIG. 5 illustrates that the reference voltage VREF is applied to a positive (+) input terminal of the comparator 112A and the feedback voltage VFB is applied to a negative (−) input terminal. However, exemplary embodiments are not limited thereto. In another exemplary embodiment, the feedback voltage VFB may be applied to the positive (+) input terminal of the comparator 112A and the reference voltage VREF may be applied to the negative (−) input terminal.

For convenience of explanation, the operation of FIG. 5 will be explained according to an exemplary embodiment in which the reference voltage VREF is applied to the positive (+) input terminal of the comparator 112A and the feedback voltage VFB is applied to the negative (−) input terminal.

The comparator 112A outputs a comparison signal S_COM in a "HIGH" logic state when the reference voltage VREF is higher than the feedback voltage VFB. The comparator 112A outputs a comparison signal S_COM in a "LOW" logic state when the reference voltage VREF is lower than the feedback voltage VFB.

The automatic trimming circuit 120 generates a trimming signal S_TRM for adjusting a voltage dividing ratio of the voltage dividing circuit 111A to reduce a difference between the reference voltage VREF and the feedback voltage VFB according to a logic state of the comparison signal S_COM input from the comparator 112A. For example, the automatic trimming circuit 120 may generate a trimming signal S_TRM for increasing a resistance value of the resistance device R2 when a comparison signal S_COM in a "HIGH" logic state is input from the comparator 112A. In another example, the automatic trimming circuit 120 may generate a trimming signal S_TRM for decreasing a resistance value of the resistance device R2 when a comparison signal S_COM in a "LOW" logic state is input from the comparator 112A. The generating the trimming signal S_TRM for increasing the resistance value of the resistance device R2 is defined as an up-trim operation UP TRIM, and the generating the trimming signal S_TRM for decreasing the resistance value of the resistance device R2 is defined as a down-trim operation DOWN TRIM.

By the above method, the trimming signal S_TRM generated by the automatic trimming circuit 120 is applied to the voltage dividing circuit 111A. The resistance value of the resistance device R2 of the voltage dividing circuit 111A changes according to the trimming signal S_TRM.

The automatic trimming circuit 120 may monitor whether the logic state of the comparison signal S_COM changes while performing the trimming mode. In detail, the automatic trimming circuit 120 stores a logic state of the comparison signal S_COM before generating a first trimming signal S_TRM_1 after starting the trimming mode. Afterwards, a logic state of the comparison signal S_COM after the resistance value of the resistance device R2 of the voltage dividing circuit 111A is changed by the first trimming signal S_TRM_1 and a logic state of the previous comparison signal S_COM stored by the automatic trimming circuit 120 are compared to each other. In this way, it is possible to detect a trimming signal causing a change in the logic state of the comparison signal S_COM by comparing logic states of the comparison signal S_COM before and after the trimming signal S_TRM is generated. For example, based on the trimming signal S_TRM, the automatic trimming circuit 120 may adjust the resistance in the voltage dividing circuit 111A. For example, the automatic trimming circuit 120 may set an adjustment value of a voltage dividing ratio of the voltage dividing circuit 111A to a final adjustment value when the comparison signal S_COM changes from a "HIGH" logic state to a "LOW" logic state. Furthermore, the automatic trimming circuit 120 may determine an adjustment value of a voltage dividing ratio of the voltage dividing circuit 111A according to the previous trimming signal S_TRM when the comparison signal S_COM changes from a "LOW" logic state to a "HIGH" logic state according to the trimming signal S_TRM. That is, when the comparison signal S_COM changes from a "LOW" logic state to a "HIGH" logic state according to an Nth (N is an integer of one or more) trimming signal S_TRM, the automatic trimming circuit 120 may determine an adjustment value of a voltage dividing ratio of the voltage dividing circuit 111A according to an (N−1)th trimming signal S_TRM as the final adjustment value.

Figure 6:
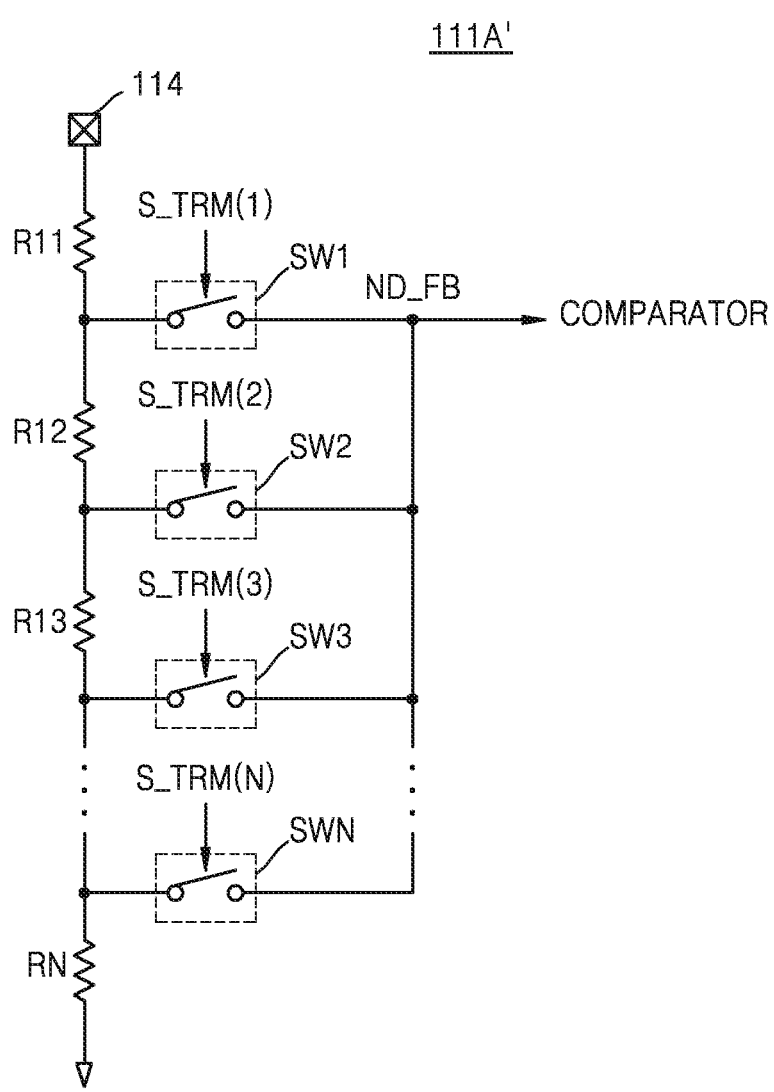
FIG. 6 is a configuration diagram of a voltage dividing circuit, according to an exemplary embodiment.

FIG. 6 is a configuration diagram of a voltage dividing circuit 111A', according to an exemplary embodiment.

Referring to FIG. 6, the voltage dividing circuit 111A' includes a serial string of resistance devices R11 to RN connected between an output pad 114 and a ground terminal. Switches SW1 to SWN are connected between nodes between the resistance devices R11 to RN and a feedback node ND_FB. Furthermore, the switches SW1 to SWN are selectively turned on or off according to a trimming signal S_TRM.

An exemplary embodiment of FIG. 6 illustrates a configuration diagram of a circuit in which switches are connected between the feedback node ND_FB and every node between the resistance devices R11 to RN. In another example, the switches may be connected between the feedback node ND_FB and some of the nodes between the connected resistance devices R11 to RN.

For example, the trimming signal S_TRM generated by the automatic trimming circuit 120 includes S_TRM(1) to S_TRM(N). For example, when digital values of S_TRM(1) to S_TRM(N) are [0, 1, 0, . . . , 0], S_TRM(2) corresponding to the switch SW2 is "1," and S_TRM(1), S_TRM(3), and S_TRM(N) corresponding to the other switches are "0." Therefore, the switch SW2 is turned on and the remaining switches are turned off. In another example, when digital values of S_TRM(1) to S_TRM(N) are [0, 0, 1, . . . , 0], S_TRM(3) corresponding to the switch SW3 is "1," and S_TRM(1), S_TRM(2), S_TRM(4), and S_TRM(N) corresponding to the other switches are "0." Therefore, SW3 is turned on and the remaining switches are turned off.

In this way, a voltage dividing ratio of the voltage dividing circuit 111A' may be adjusted by the trimming signal S_TRM. In other words, a voltage of the feedback node ND_FB in the voltage dividing circuit 111A' may be adjusted by the trimming signal S_TRM when a target voltage VPP is forced to the output pad 114 from outside in a trimming mode.

Figure 7:
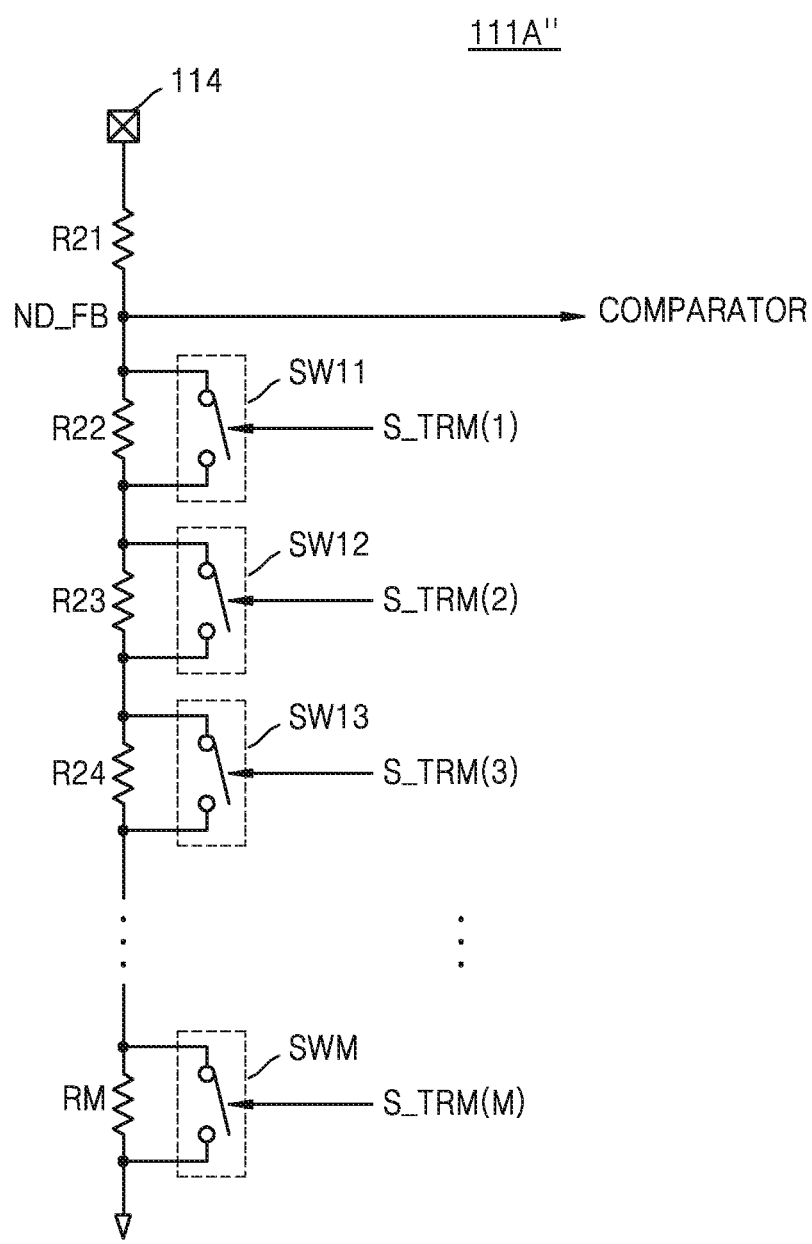
FIG. 7 is a configuration diagram of a voltage dividing circuit, according to another exemplary embodiment.

FIG. 7 is a configuration diagram of a voltage dividing circuit 111A'', according to another exemplary embodiment.

Referring to FIG. 7, the voltage dividing circuit 111A'' includes a serial string of resistance devices R21 to RM connected between an output pad 114 and a ground terminal, and switches SW11 to SWM are respectively connected in parallel to the resistance devices R22 to RM, which are connected between a feedback node ND_FB and the ground terminal. Furthermore, the switches SW11 to SWM are selectively turned on or off according to a trimming signal S_TRM.

An exemplary embodiment of FIG. 7 illustrates a configuration diagram of a circuit in which the switches SW11 to SWM are respectively connected in parallel to all of the resistance devices R22 to RM. For example, switches may be respectively connected in parallel to some of the resistance devices R22 to RM. In another example, a serial string of resistance devices may be arranged between the output pad 114 and the feedback node ND_FB, and switches may be respectively connected in parallel to all or some of a plurality of resistance devices between the output pad 114 and the feedback node ND_FB. As another example, a serial string of resistance devices may be arranged between the output pad 114 and the feedback node ND_FB, and a serial string of resistance devices may be arranged between the feedback node ND_FB and the ground terminal. Furthermore, switches may be respectively connected in parallel to all or some of a plurality of resistance devices between the output pad 114 and the feedback node ND_FB, or may be respectively connected in parallel to all or some of a plurality of resistance devices between the feedback node ND_FB and the ground terminal.

For example, the trimming signal S_TRM generated by the automatic trimming circuit 120 includes S_TRM(1) to S_TRM(M). For example, when digital values of S_TRM(1) to S_TRM(M) are [1, 1, 0, . . . , 0], S_TRM(1), S_TRM(2) corresponding to the switches SW11 and SW12 are "1," and S_TRM(2) to S_TRM(M) corresponding to the switches SW11 and SW12 are "0." Therefore, the switches SW11 and SW12 are turned on and the remaining switches are turned off. In another example, when digital values of S_TRM(1) to S_TRM(M) are [1, 0, 0, . . . , 0], S_TRM(1) corresponding to the switch SW11 is "1," and SS_TRM(2) to S_TRM(M) corresponding to the other switches are "0." Therefore, SW11 is turned on and the remaining switches are turned off.

In this way, a voltage dividing ratio of the voltage dividing circuit 111A'' may be adjusted by the trimming signal S_TRM. In other words, a voltage of the feedback node ND_FB in the voltage dividing circuit 111A'' may be adjusted by the trimming signal S_TRM when a target voltage VPP is forced to the output pad 114 from outside in a trimming mode.

Figure 8:
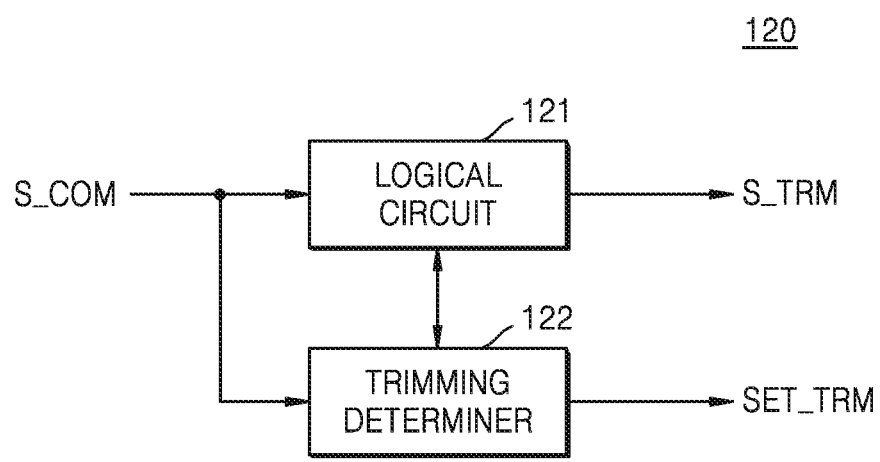
FIG. 8 is a configuration diagram of an automatic trimming circuit illustrated in FIGS. 1 and 2.

FIG. 8 is a configuration diagram of the automatic trimming circuit 120 illustrated in FIGS. 1 and 2.

Referring to FIG. 8, the automatic trimming circuit 120 includes a logical circuit 121 and a trimming determiner 122.

The logical circuit 121 generates a trimming signal S_TRM for adjusting a voltage dividing ratio of the voltage dividing circuit 111A based on a logic state of a comparison signal S_COM input from the comparator 112A. The logical circuit 121 may generate flag information FLAG of one bit according to the logic state of the comparison signal S_COM.

For example, the flag information FLAG may be set to "1" when the logic state of the comparison signal S_COM is "HIGH," and be set to "0" when the logic state of the comparison signal S_COM is "LOW."

If the flag information FLAG is "1," the logical circuit 121 may generate a trimming signal S_TRM for increasing the resistance value of the resistance device R2 of the voltage dividing circuit 111A illustrated in FIG. 5. In other words, when the flag information FLAG is "1," an up-trim operation UP TRIM increasing the resistance value of the resistance device R2 of the voltage dividing circuit 111A is performed according to the trimming signal S_TRM.

If the flag information FLAG is "0," the logical circuit 121 may generate a trimming signal S_TRM for decreasing the resistance value of the resistance device R2 of the voltage dividing circuit 111A illustrated in FIG. 5. In other words, when the flag information FLAG is "0," a down-trim operation DOWN TRIM reducing the resistance value of the resistance device R2 of the voltage dividing circuit 111A is performed according to the trimming signal S_TRM.

The trimming determiner 122 may monitor whether the flag information FLAG changes during the trimming mode. If the flag information FLAG changes during the trimming mode, the trimming determiner 122 determines the final voltage dividing ratio after the automatic trimming circuit 120 adjusts a voltage dividing ratio of the voltage dividing circuit 111A For example, when the flag information FLAG changes from "1" to "0," the trimming determiner 122 may determine an adjustment value of a voltage dividing ratio of the voltage dividing circuit 111A according to a current trimming signal S_TRM generated by the logical circuit 121 as the final adjustment value. In other words, when the flag information FLAG changes from "1" to "0," the trimming determiner 122 may set the final adjustment value SET_TRM to a value corresponding to a current trimming signal S_TRM output from the logical circuit 121. The final adjustment value SET_TRM may be a digital value.

For example, when the flag information FLAG changes from "0" to "1," the trimming determiner 122 may determine an adjustment value of a voltage dividing ratio of the voltage dividing circuit 111A according to a previous trimming signal S_TRM generated by the logical circuit 121 as the final adjustment value. In other words, when the flag information FLAG changes from "1" to "0" by using an Nth trimming signal S_TRM, the trimming determiner 122 may set the final adjustment value SET_TRM to a value corresponding to an (N−1)th trimming signal S_TRM output from the logical circuit 121. The final adjustment value SET_TRM may be a digital value.

For example, the final adjustment value SET_TRM may be stored in a memory through a processor of a semiconductor integrated circuit to which the internal voltage trimming devices 100A and 100B are applied.

Figure 9:
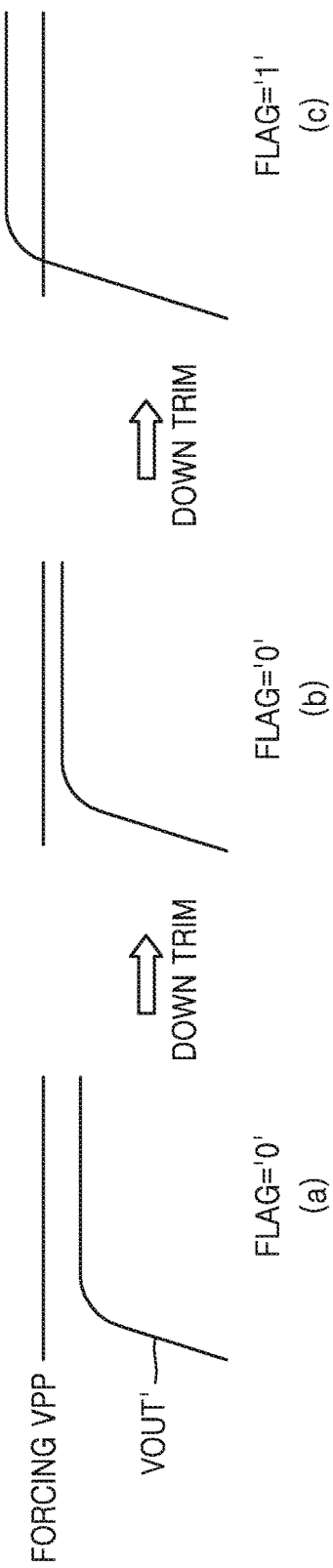
FIG. 9 is a diagram illustrating a relationship between a forcing voltage and an internal voltage for explaining a down-trim operation in an internal voltage trimming device, according to an exemplary embodiment.

FIG. 9 is a diagram illustrating a relationship between a forcing voltage and an internal voltage for explaining a down-trim operation in an internal voltage trimming device, according to an exemplary embodiment.

Referring to FIG. 5, in a trimming mode, the flag information FLAG is "0" when a logic state of the comparison signal S_COM output from the comparator 112A is "LOW." The flag information FLAG is "0" when the reference voltage VREF is lower than the feedback voltage VFB, and when the target voltage VPP is forced to the output pad 114.

For example, target resistance values are set while designing products. However, resistances may increase due to a factor such as process variation. If resistance device R2 of the voltage dividing circuit 111A increases above a target resistance value, the flag information FLAG is "0." Therefore, during operation of the internal voltage generating circuit 110, if the resistance value of the resistance device R2 increases due to a factor such as process variation, an internal voltage VOUT' generated by the internal voltage generating circuit 110 may be lower than the target voltage VPP, as shown in portion (a) of FIG. 9.

In this way, the automatic trimming circuit 120 performs a down-trim operation DOWN TRIM when the flag information FLAG is "0." In other words, the automatic trimming circuit 120 may supply a trimming signal S_TRM for decreasing the resistance value of the resistance device R2 of the voltage dividing circuit 111A to the voltage dividing circuit 111A.

The internal voltage VOUT' generated by the internal voltage generating circuit 110 when the internal voltage generating circuit 110 is in an operating mode is higher compared to the internal voltage VOUT' before the down-trim operation when the flag information FLAG is "0" even after the down-trim operation. However, the internal voltage VOUT' is lower than the target voltage VPP. That is, the internal voltage VOUT' illustrated in portion (b) of FIG. 9 is increased to a voltage level higher than the internal voltage VOUT' illustrated in portion (a) of FIG. 9 before the down-trim operation, but is lower than the target voltage VPP.

Therefore, the automatic trimming circuit 120 may regenerate the trimming signal S_TRM for decreasing the resistance value of the resistance device R2 of the voltage dividing circuit 111A and may supply the trimming signal S_TRM to the voltage dividing circuit 111A.

The internal voltage VOUT' generated by the internal voltage generating circuit 110 when the internal voltage generating circuit 110 is in an operating mode is increased higher than the target voltage VPP as illustrated in portion (c) of FIG. 9, when the flag information FLAG changes to "1" after the down-trim operation.

Therefore, when the flag information FLAG changes from "0" to "1" in the trimming mode, the final adjustment value SET_TRM may be set to a digital value corresponding to the trimming signal S_TRM applied to a previous trimming operation state like portion (b) of FIG. 9.

Figure 10:
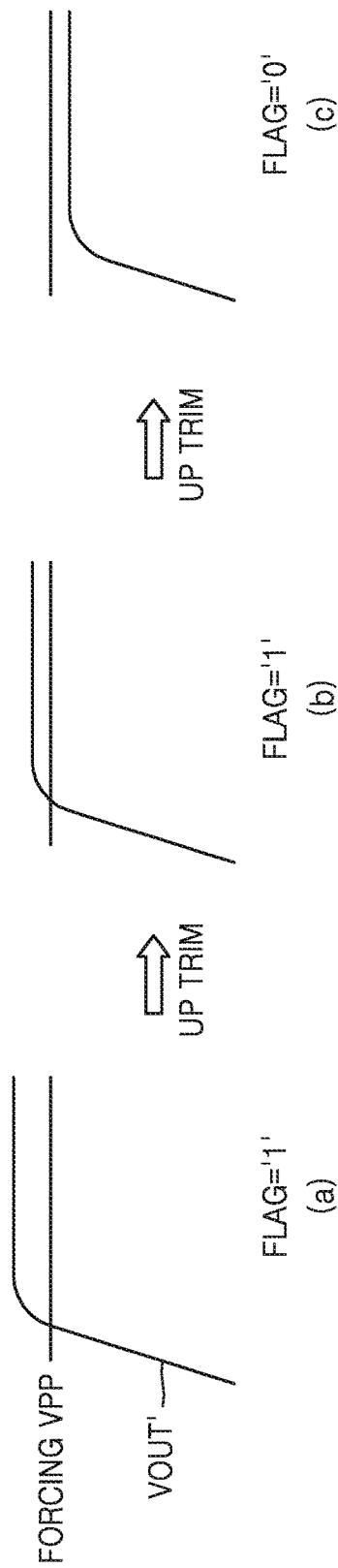
FIG. 10 is a diagram illustrating a relationship between a forcing voltage and an internal voltage for explaining an up-trim operation in an internal voltage trimming device, according to an exemplary embodiment.

FIG. 10 is a diagram illustrating a relationship between a forcing voltage and an internal voltage for explaining an up-trim operation in an internal voltage trimming device, according to an exemplary embodiment.

Referring to FIG. 5, the flag information FLAG is "1" when a logic state of the comparison signal S_COM output from the comparator 112A in a trimming mode is "HIGH." The flag information FLAG is "1" when the reference voltage VREF is higher than the feedback voltage VFB, and when the target voltage VPP is forced to the output pad 114.

For example, the flag information FLAG is "1" when a target resistance value of the resistance device R2 of the voltage dividing circuit 111A is decreased due to a factor such as process variation, and the target resistance value is set while designing products. Therefore, if the internal voltage generating circuit 110 is in an operating mode when the resistance value of the resistance device R2 is decreased due to a factor such as process variation, an internal voltage VOUT' generated by the internal voltage generating circuit 110 may become higher than the target voltage VPP, like portion (a) of FIG. 10.

In this way, the automatic trimming circuit 120 performs an up-trim operation UP TRIM when the flag information FLAG is "1." In other words, the automatic trimming circuit 120 may supply a trimming signal S_TRM for increasing the resistance value of the resistance device R2 of the voltage dividing circuit 111A to the voltage dividing circuit 111A.

When the flag information FLAG is "1" even after the up-trim operation, the internal voltage VOUT' generated by the internal voltage generating circuit 110 when the internal voltage generating circuit 110 is in an operating mode is decreased compared to the internal voltage VOUT' before the up-trim operation. However, the internal voltage VOUT' is still higher than the target voltage VPP. That is, the internal voltage VOUT' illustrated in portion (b) of FIG. 10 is decreased to a voltage level lower than the internal voltage VOUT' illustrated in (a) of FIG. 10 before the up-trim operation, but is higher than the target voltage VPP.

Therefore, the automatic trimming circuit 120 may regenerate the trimming signal S_TRM for increasing the resistance value of the resistance device R2 of the voltage dividing circuit 111A and may supply the trimming signal S_TRM to the voltage dividing circuit 111A.

When the flag information FLAG changes to "0" after the up-trim operation, the internal voltage VOUT' generated by the internal voltage generating circuit 110 when the internal voltage generating circuit 110 is in an operating mode becomes lower than the target voltage VPP as illustrated in portion (c) of FIG. 10.

Therefore, when the flag information FLAG changes from "1" to "0" in the trimming mode, the final adjustment value SET_TRM may be set to a digital value corresponding to the trimming signal S_TRM applied to a current trimming operation state like portion (c) of FIG. 10.

Figure 11:
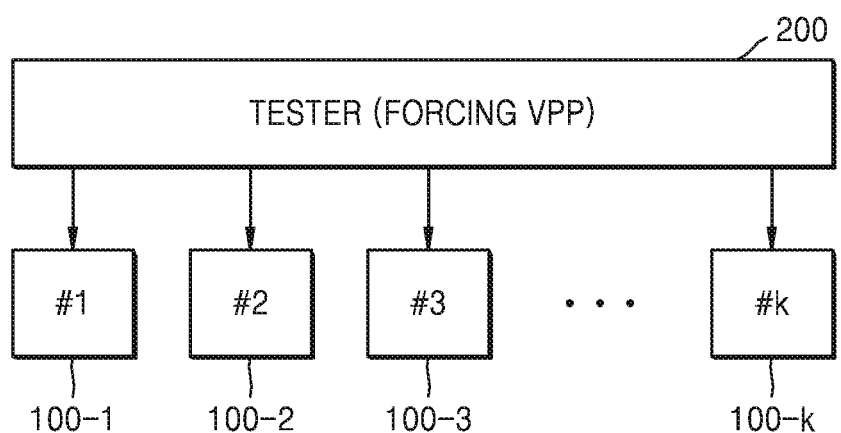
FIG. 11 is a configuration diagram of a system performing an internal voltage automatic trimming operation for each of a plurality of chips in a semiconductor test process, according to an exemplary embodiment.

FIG. 11 is a configuration diagram of a system performing an internal voltage automatic trimming operation for each of a plurality of chips in a semiconductor test process, according to an exemplary embodiment.

Referring to FIG. 11, the system may perform an internal voltage automatic trimming operation on a plurality of chips 100-1 to 100-k in parallel by using a tester 200. Each of the chips 100-1 to 100-k includes the internal voltage trimming device 100A or 100B illustrated in FIG. 1 or FIG. 2. Furthermore, the tester 200 may simultaneously supply a target voltage VPP to the chips 100-1 to 100-k. In detail, the tester 200 may simultaneously force the target voltage VPP to the output pad 114 of the internal voltage trimming device 100A or 100B included in each of the chips 100-1 to 100-k. For example, the target voltage VPP may be determined as a lower limit value or an upper limit value of a trimming range of the internal voltage.

Figure 12:
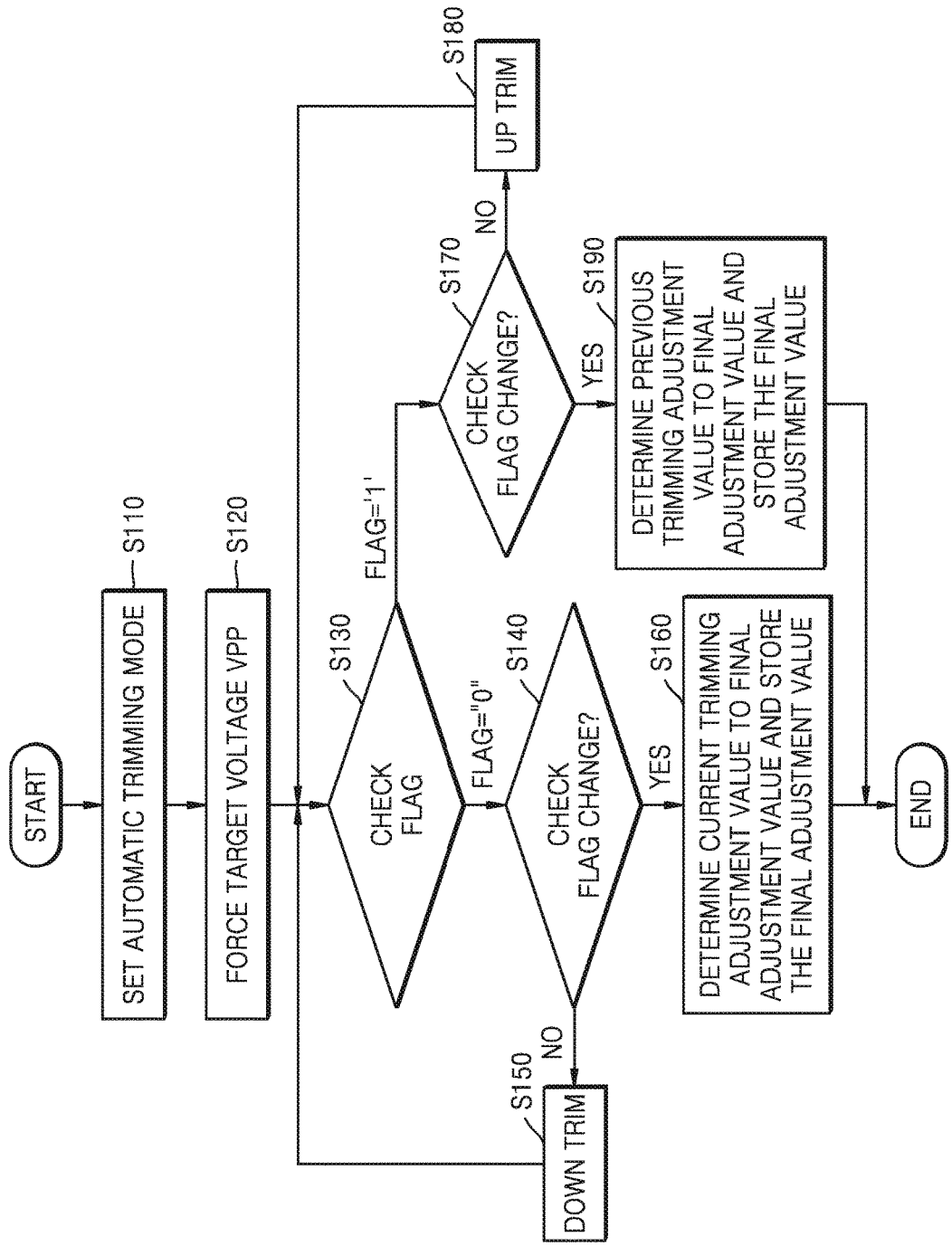
FIG. 12 is a flowchart of an internal voltage trimming method according to an exemplary embodiment.
Figure 14:
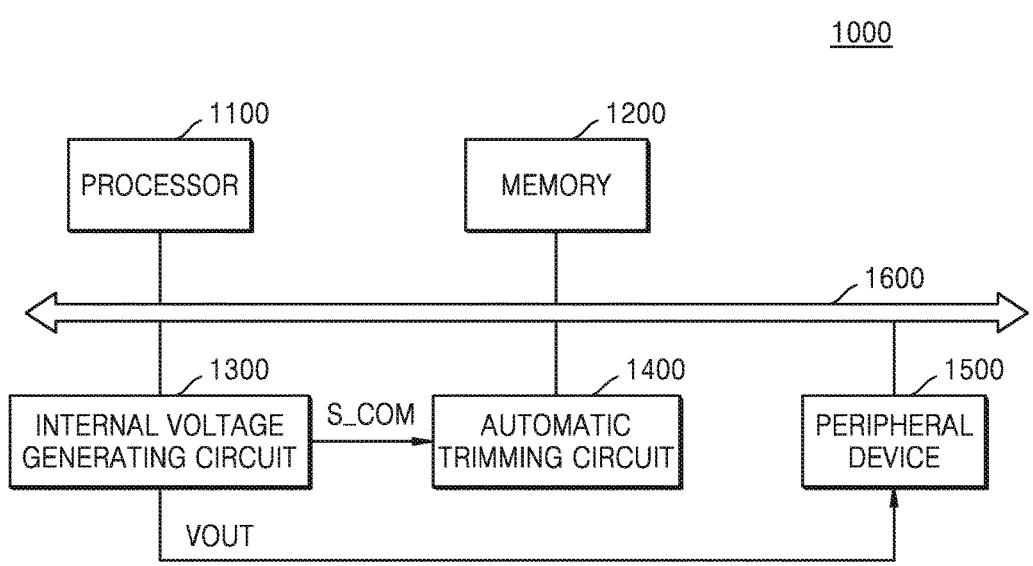
FIG. 14 is a block diagram of a semiconductor integrated circuit to which an internal voltage trimming device is applied, according to an exemplary embodiment.

FIG. 12 is a flowchart of an internal voltage trimming method according to an exemplary embodiment. For example, FIG. 12 is a flowchart of an internal voltage trimming method in a semiconductor integrated circuit as illustrated in FIG. 14 including the internal voltage trimming device illustrated in FIG. 1 or FIG. 2.

First, in operation S110, a processor of the semiconductor integrated circuit sets an automatic trimming mode in the internal voltage trimming device 100A or 100B. The automatic trimming mode has the same concept as the trimming mode performed by the automatic trimming circuit as explained above. In the automatic trimming mode, the DC-DC converter 113 of the internal voltage generating circuit 110 included in the internal voltage trimming device 100A or 100B is disabled and the automatic trimming circuit 120 is enabled.

Next, in operation S120, the target voltage VPP is forced to the output pad 114 of the internal voltage generating circuit 110. For example, the target voltage VPP may be forced to the output pad 114 of the internal voltage generating circuit 110 included in each of the plurality of chips as illustrated in FIG. 11, by using a tester from outside.

Next, in operation S130, the automatic trimming circuit 120 checks flag information displaying a logic state of the comparison signal S_COM output from the comparator 112 of the internal voltage generating circuit 110.

If the checked flag information is "0," in operation S140, the automatic trimming circuit 120 determines whether the flag information changes compared to the previous flag information. In other words, the automatic trimming circuit 120 may determine whether the flag information changes from "1" to "0."

If the flag information does not change, in operation S150, the automatic trimming circuit 120 performs the down-trim operation DOWN TRIM. The down-trim operation is for decreasing a resistance value of the resistance device R2 of the voltage dividing circuit 111A included in the internal voltage generating circuit 110. For example, the automatic trimming circuit 120 performs a down-trim operation supplying the trimming signal S_TRM for decreasing a resistance value of the resistance device R2 of voltage dividing circuit 111A to the voltage dividing circuit 111A. The feedback voltage VFB applied to a negative input terminal of the comparator 112 is decreased by performing the down-trim operation. Accordingly, a difference between the reference voltage VREF and the feedback voltage VFB is lower compared to the difference before the down-trim operation. Operation S130 is performed again after performing operation S150.

If the flag information changes, in operation S160, the automatic trimming circuit 120 determines a current trimming adjustment value to be the final adjustment value, and the processor stores the final adjustment value in a memory. For example, the final adjustment value SET_TRM may be a digital value corresponding to the trimming signal S_TRM applied to a current trimming operation state.

After performing operation S130, if the confirmed flag information is "1," in operation S170, the automatic trimming circuit 120 determines whether the flag information changes compared to the previous flag information. In other words, the automatic trimming circuit 120 may determine whether the flag information changes from "0" to "1."

After performing S170, if the flag information does not change, in operation S180, the automatic trimming circuit 120 performs the up-trim operation UP TRIM. The up-trim operation is for increasing a resistance value of the resistance device R2 of the voltage dividing circuit 111A included in the internal voltage generating circuit 110. For example, the automatic trimming circuit 120 performs an up-trim operation supplying the trimming signal S_TRM for increasing a resistance value of the resistance device R2 of voltage dividing circuit 111A to the voltage dividing circuit 111A. The feedback voltage VFB applied to a negative input terminal of the comparator 112 is decreased by performing the up-trim operation. Accordingly, a difference between the reference voltage VREF and the feedback voltage VFB is lower compared to the difference before the up-trim operation. Operation S130 is performed again after performing operation S180.

After performing S170, if the flag information changes, in operation S190, the automatic trimming circuit 120 determines a previous trimming adjustment value to be the final adjustment value, and the processor stores the final adjustment value in a memory. For example, the final adjustment value SET_TRM may be set to a digital value corresponding to the trimming signal S_TRM applied during a state just before the current trimming operation state.

Figure 13:
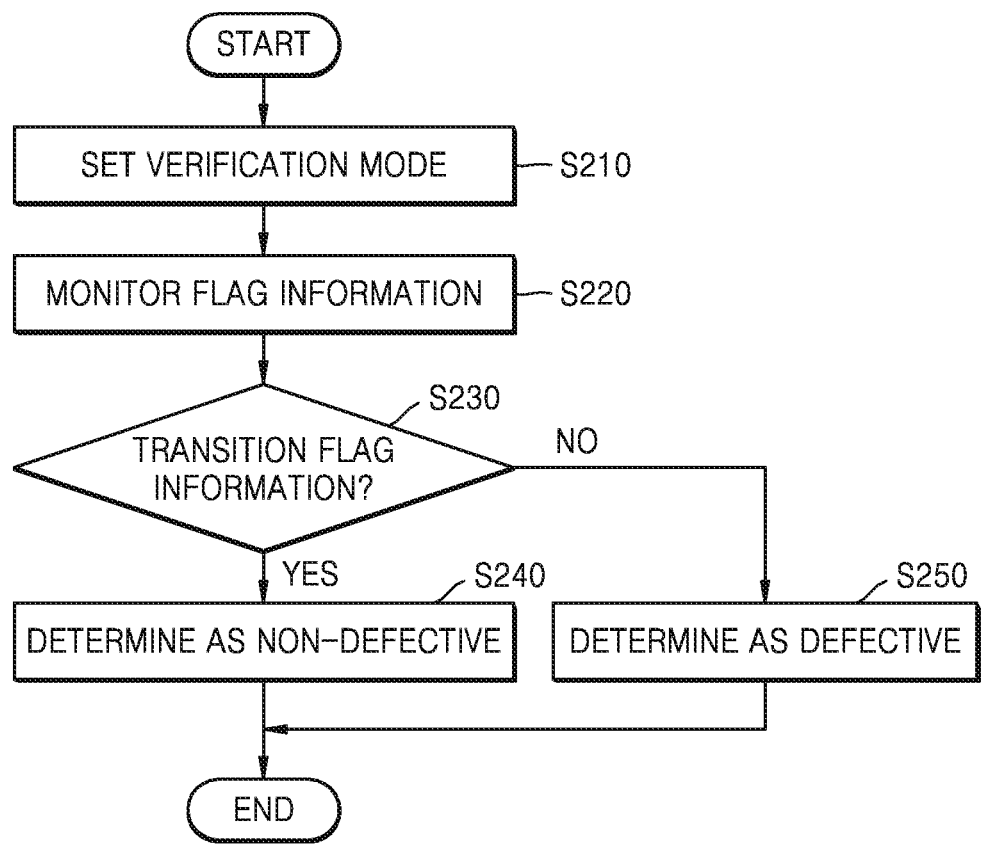
FIG. 13 is a flowchart illustrating a method of verifying an internal voltage generating circuit according to an exemplary embodiment.

FIG. 13 is a flowchart illustrating a method of verifying an internal voltage generating circuit according to an exemplary embodiment. For example, FIG. 13 is a flowchart illustrating a verifying method of an internal voltage trimming method in a semiconductor integrated circuit as illustrated in FIG. 14 including the internal voltage trimming device 100B illustrated in FIG. 2.

For example, the method of verifying the internal voltage generating circuit of FIG. 13 may be performed after performing the internal voltage trimming method illustrated in FIG. 12. In other words, operation S210 of FIG. 13 may be continuously performed after performing operations S160 or S190 of FIG. 12.

First, in operation S210, a processor of the semiconductor integrated circuit sets a verification mode in the internal voltage trimming device 100B. In the verification mode, the verifier 130 of the internal voltage trimming device 100B is enabled and the automatic trimming circuit 120 is disabled. Furthermore, the voltage dividing circuit 111, the comparator 112, and the DC-DC converter 113 are set to be enabled. In the verification mode, the target voltage VPP is not forced to the output pad 114.

Next, in operation S220, the verifier 130 monitors flag information displaying a logic state of the comparison signal S_COM output from the comparator 112 of the internal voltage generating circuit 110.

In operation S230, the verifier 130 determines whether the flag information transitions during an initial set time period of the monitoring according to operation S220. The verifier 130 may determine whether the flag information transitions during an initial set time period as a result of the monitoring according to operation S220. That is, the verifier 130 may determine whether the flag information transitions from "1" to "0" or "0" to "1" at least once during an initial set time period.

When the flag information transitions, in operation S240, the verifier 130 determines the internal voltage generating circuit 110 as non-defective. When the flag information does not transition, in operation S250, the verifier 130 determines the internal voltage generating circuit 110 as defective. For example, when the DC-DC converter 113 included in the internal voltage generating circuit 110 is designed by the voltage pump circuit as illustrated in FIG. 3 and when a target voltage is not generated due to the shortage of charge pumping capacity of a voltage pump circuit, the flag information does not transitioned.

FIG. 14 is a block diagram of a semiconductor integrated circuit 1000 to which an internal voltage trimming device is applied, according to an exemplary embodiment.

Referring to FIG. 14, the semiconductor integrated circuit 1000 includes a processor 1100, a memory 1200, an internal voltage generating circuit 1300, an automatic trimming circuit 1400, a peripheral device 1500, and a bus 1600.

The semiconductor integrated circuit 1000 may communicate with a video card, a sound card, a memory card, or a universal serial bus (USB) device, or may further include ports capable of communicating with other electronic devices.

The bus 1600 is a transmission line transmitting data, command, address, and control signals between components of the semiconductor integrated circuit 1000.

The processor 1100 may perform calculations or tasks. For example, the processor 1100 may be a micro-processor, a central processing unit (CPU). The processor 1100 may control the memory 1200, the internal voltage generating circuit 1300, the automatic trimming circuit 1400, and the peripheral device 1500 through the bus 1600 such as an address bus, a control bus, and a data bus. According to an exemplary embodiment, the processor 1100 may also be connected to an expansion bus such as a peripheral component interconnect (PCI) bus. For example, the processor 1100 may generate the first and second enable signals EN1 and EN2 for selectively enabling the internal voltage generating circuit 1300 and the automatic trimming circuit 1400 in the operating mode and the trimming mode as explained in FIGS. 1 and 2.

For example, the processor 1100 may include the verifier 130 illustrated in FIG. 2. In other words, the processor 1100 may design a function of the verifier 130 illustrated in FIG. 2 to be realized as hardware or software in the processor 1100.

The memory 1200 may be realized as dynamic random access memory (DRAM) or static random access memory (SRAM). In another example, the memory 1200 may be realized as a non-volatile memory. The memory 1200 stores data, commands, or program codes for operations of the semiconductor integrated circuit 1000. For example, the memory 1200 may store data, commands, or program codes for performing flowcharts such as FIGS. 12 and 13.

The internal voltage generating circuit 110 and the automatic trimming circuit 120 may be applied to the internal voltage generating circuit 1300 and the automatic trimming circuit 1400 explained in FIG. 1 or FIG. 2. As described above, the comparison signal S_COM generated by the internal voltage generating circuit 1300 is supplied to the automatic trimming circuit 1400, and the internal voltage VOUT generated by the internal voltage generating circuit 1300 may be supplied to the peripheral device 1500.

The peripheral device 1500 may include an input/output device controlled by the processor 1100, an auxiliary storage device, or an external storage device. For example, the peripheral device 1500 may include a memory device, a display device, a mobile device, a personal digital assistant (PDA), or a camera.

Figure 15:
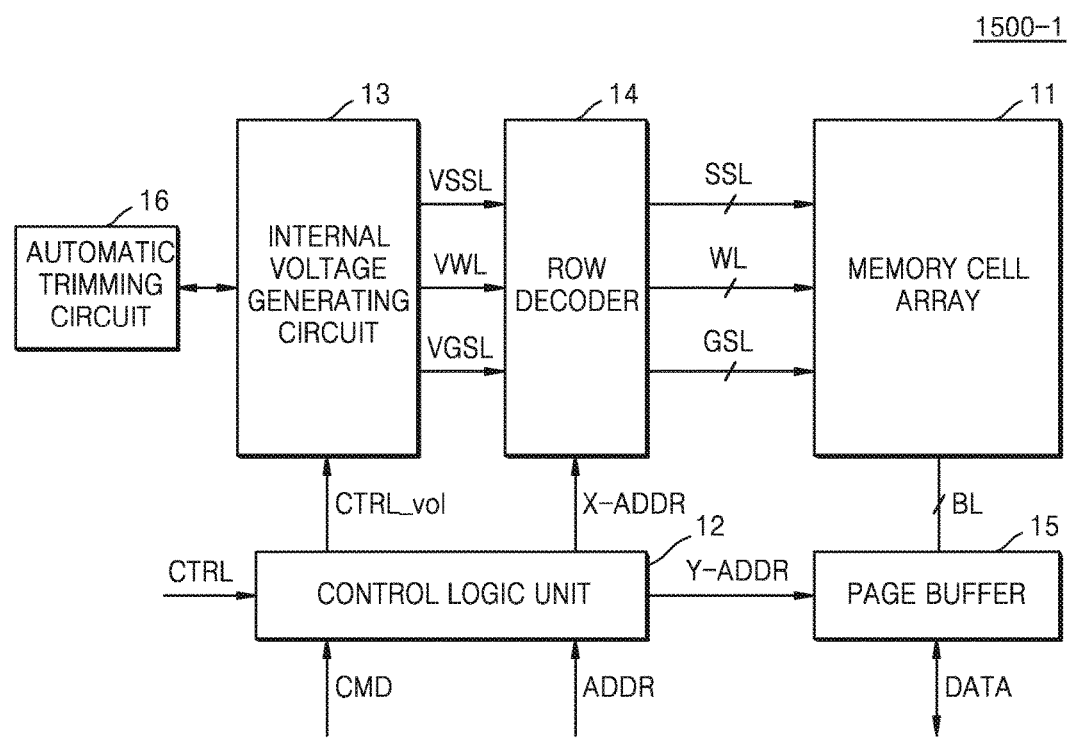
FIG. 15 is a configuration diagram of a memory device that is an example of a peripheral device illustrated in FIG. 14.

FIG. 15 is a configuration diagram of a memory device 1500-1 that is an example of the peripheral device 1500 illustrated in FIG. 14.

Referring to FIG. 15, the memory device 1500-1 includes a memory cell array 11, a control logic 12, an internal voltage generating circuit 13, a row decoder 14, a page buffer 15, and an automatic trimming circuit 16.

The memory cell array 11 may be connected to at least one string selection line SSL, a plurality of word lines WL, at least one ground selection line GSL, and a plurality of bit lines BL. The memory cell array 11 may include a plurality of memory cells arranged in regions where the plurality of word lines WL and the plurality of bit lines BL intersect with each other. For example, the memory cell array 11 may be realized as a flash memory cell array.

A plurality of memory cells MC become an erase state when an erase voltage may be applied to the memory cell array 11, and become a program state when a program voltage may be applied to the memory cell array 11.

The control logic 12 may output various control signals for reading/writing data from/to the memory cell array 11 based on a command signal CMD received from the processor 1100, an address signal ADDR, and a control signal CTRL. Therefore, the control logic 12 may control various operations in the memory device 1500-1.

The various control signal output from the control logic 12 may be provided to the internal voltage generating circuit 13, the row decoder 14, and the page buffer 15. In detail, the control logic 12 may provide a voltage control signal CTRL_vol to the internal voltage generating circuit 13, a row address X_ADDR to the row decoder 14, and a column address Y_ADDR to the page buffer 15.

The internal voltage generating circuit 13 may generate various kinds of voltages for performing program, read, and erase operations with respect to the memory cell array 11 based on the voltage control signal CTRL_vol. In detail, the internal voltage generating circuit 13 may generate a first driving voltage VWL for operating a plurality of word lines WL, a second driving voltage VSSL for operating a plurality of string selection lines SSL, and a third driving voltage VGSL for operating a plurality of round selection lines GSL.

Here, the first driving voltage VWL may be a program voltage (or write voltage), a read voltage, an erase voltage, a pass voltage, or a program verifying voltage. Furthermore, the second driving voltage VSSL may be a string selection voltage, that is, an on or off voltage. Furthermore, the third driving voltage VGSL may be a ground selection voltage, that is, an on or off voltage.

The row decoder 14 is connected to the memory cell array 11 through the plurality of word lines WL, and may activate some of the plurality of word lines WL in response to the row address X_ADDR received from the control logic 12. In detail, the row decoder 14 may apply a read voltage to a selected word line and apply a pass voltage to a non-selected word line during the read operation.

The row decoder 14 may apply a program voltage to a selected word line and apply a pass voltage to a non-selected word line during the program operation. In an exemplary embodiment, the row decoder 14 may apply the program voltage to a selected word line and an additionally selected word line in at least one among program loops.

The page buffer 15 may be connected to the memory cell array 11 through the plurality of bit lines BL. In detail, the page buffer 15 may be operated as a sense amplifier and may output data DATA stored in the memory cell array 11 during the read operation. The page buffer 15 may be operated as a write driver and may output data DATA to be stored in the memory cell array 11 during the program operation.

The automatic trimming circuit 16 automatically adjusts the first driving voltage VWL generated by the internal voltage generating circuit 13 in a trimming mode. For example, the automatic trimming circuit 16 may automatically adjust a program voltage (or a write voltage), a read voltage, and an erase voltage respectively generated in a program mode, an erase mode, and a read mode.

For reference, the internal voltage generating circuit 13 and automatic trimming circuit 16 included in the memory device 1500-1 of FIG. 15 correspond to the internal voltage generating circuit 1300 and the automatic trimming circuit 1400 of FIG. 14, respectively. The first driving voltage VWL generated by the internal voltage generating circuit 13 may be the internal voltage VOUT generated by the internal voltage generating circuit 1300.

Figure 16:
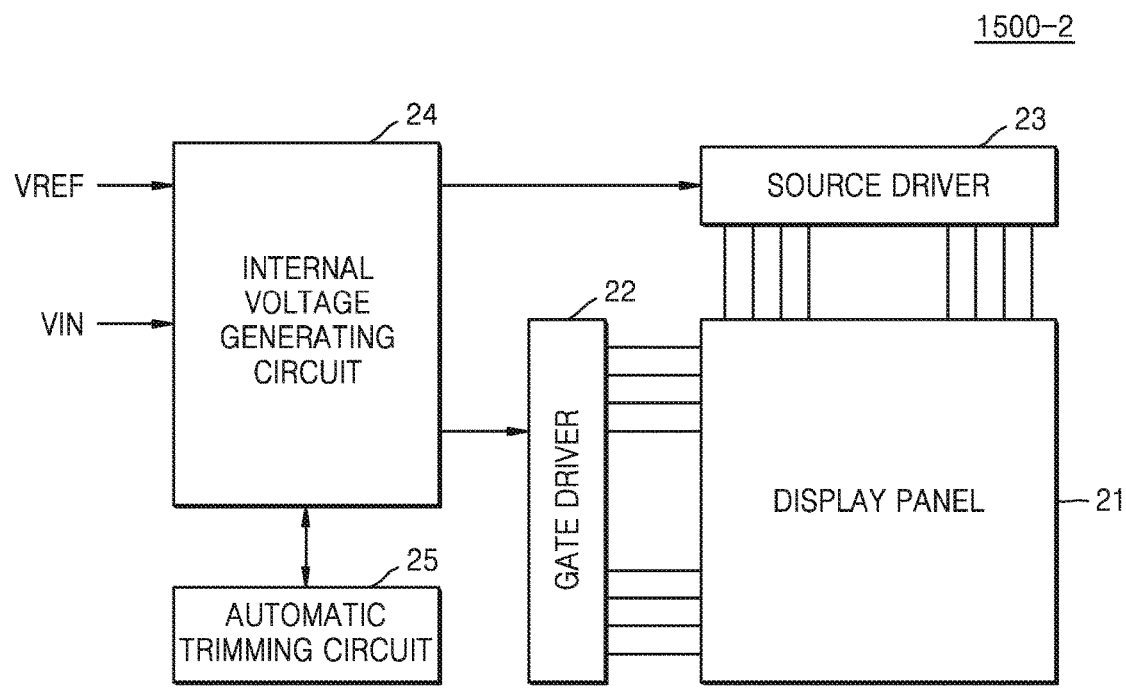
FIG. 16 is a configuration diagram of a display device that is another example of a peripheral device illustrated in FIG. 14.

FIG. 16 is a configuration diagram of a display device 1500-2 that is another example of the peripheral device 1500 illustrated in FIG. 14.

Referring to FIG. 16, the display device 1500-2 includes a display panel 21, a gate driver 22, a source driver 23, an internal voltage generating circuit 24, and an automatic trimming circuit 25.

For example, the display panel 21 may be a liquid display device. The display panel 21 includes a plurality of pixels arranged in respective intersections of a plurality of gate lines and a plurality of source lines.

The gate driver 22 is a circuit for operating the gate lines of the display panel 21 by using a first internal voltage, and the source driver 23 is a circuit for outputting an analog gray scale signal corresponding to image data to the source lines by using a second internal voltage.

The internal voltage generating circuit 24 may generate the first and second internal voltages respectively used in the gate driver 22 and the source driver 23 based on an input voltage VIN and a reference voltage VREF. The automatic trimming circuit 25 automatically adjusts the first and second internal voltages generated by the internal voltage generating circuit 24 in a trimming mode.

For reference, the internal voltage generating circuit 24 and automatic trimming circuit 25 included in the display device 1500-2 of FIG. 16 correspond to the internal voltage generating circuit 1300 and the automatic trimming circuit 1400 of FIG. 14, respectively. For example, the internal voltage generating circuit 110 of FIG. 1 may be plural to generate a plurality of voltages and may be included in the internal voltage generating circuit 24.

In addition, the exemplary embodiments may also be implemented through computer-readable code and/or instructions on a medium, e.g., a computer-readable medium, to control at least one processing element to implement any above-described exemplary embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An internal voltage trimming device comprising:
   a voltage dividing circuit configured to generate a feedback voltage, based on a first voltage dividing ratio of the voltage dividing circuit and a voltage of an output pad, the voltage dividing circuit comprising resistance devices that are configured to set the first voltage dividing ratio;
   a comparator configured to compare a reference voltage and the feedback voltage, and generate a comparison signal based on the comparison;
   a direct current to direct current (DC-DC) converter configured to generate, in an operating mode, an internal voltage, based on an input voltage and the comparison signal, and output the internal voltage to the output pad;
   an automatic trimming circuit configured to generate, in a trimming mode, a trimming signal for reducing a difference between the reference voltage and the feedback voltage, based on the comparison signal,
   wherein, in the trimming mode, the DC-DC converter is further configured to be disabled, a target voltage is applied to the output pad, and the voltage dividing circuit is further configured to adjust the first voltage dividing ratio, based on the trimming signal, and
   wherein the feedback voltage applied to the comparator in the operating mode is obtained by dividing the internal voltage, and the feedback voltage applied to the comparator in the trimming mode is obtained by dividing the target voltage, and
   a verifier configured to, in a verification mode, block the target voltage applied to the output pad, and determine at least one among the voltage dividing circuit, the comparator, and the DC-DC converter as defective in response to a change in a logic state of the comparison signal not occurring during an initial set time period during which the DC-DC converter is enabled.

2. The internal voltage trimming device of claim 1, wherein, in the trimming mode, the target voltage is generated and applied to the output pad by an external tester.

3. The internal voltage trimming device of claim 1, wherein the comparator comprises:
a first input terminal configured to receive the reference voltage;
a second input terminal connected to a feedback node, the second input terminal being configured to receive the feedback voltage; and
an operation amplifier configured to generate the comparison signal, based on a voltage difference between the first input terminal and the second input terminal.

4. The internal voltage trimming device of claim 1, wherein the resistance devices of the voltage dividing circuit are connected in a serial string between the output pad and a ground terminal, and
the voltage dividing circuit further comprises switches respectively connected between nodes of the serial string and a feedback node, the switches being configured to be turned on based on the trimming signal.

5. The internal voltage trimming device of claim 1, wherein the resistance devices of the voltage dividing circuit are connected in a serial string between the output pad and a ground terminal, and
the voltage dividing circuit further comprises a switch connected to one among the resistance devices in parallel, the switch being configured to be turned on based on the trimming signal.

6. The internal voltage trimming device of claim 1, wherein the DC-DC converter is further configured to set the internal voltage to be lower or higher than the input voltage, based on the comparison signal.

7. The internal voltage trimming device of claim 1, wherein the DC-DC converter comprises:
an oscillator configured to generate a pulse signal, and change at least one among a frequency and a duty cycle of the pulse signal, based on the comparison signal; and
a voltage pump circuit configured to boost the input voltage in response to the pulse signal to generate the internal voltage.

8. The internal voltage trimming device of claim 1, wherein the automatic trimming circuit is further configured to determine a final voltage dividing ratio of the voltage dividing circuit to be the first voltage dividing ratio corresponding to the trimming signal in response to the change in the logic state of the comparison signal.

9. The internal voltage trimming device of claim 1, wherein the automatic trimming circuit comprises:
a logical circuit configured to generate the trimming signal, based on the logic state of the comparison signal; and
a trimming determiner configured to determine a final voltage dividing ratio of the voltage dividing circuit to be the first voltage dividing ratio corresponding to the trimming signal in response to the comparison signal changing from a first logic state to a second logic state.

10. The internal voltage trimming device of claim 9, wherein the trimming determiner is further configured to determine the final voltage dividing ratio to be a second voltage dividing ratio corresponding to an (N−1)th trimming signal in response to the comparison signal changing from the second logic state to the first logic state, the trimming signal being an Nth trimming signal, and N being an integer of two or more.

11. A semiconductor integrated circuit comprising:
an internal voltage generating circuit configured to:
generate, using a comparator, a comparison signal based on a first difference between a reference voltage and a feedback voltage that is received from an output pad via a voltage dividing circuit;
generate, using a direct current to direct current (DC-DC) converter, an internal voltage, based on the comparison signal; and
output the internal voltage to the output pad;
an automatic trimming circuit configured to generate a trimming signal for adjusting a first voltage dividing ratio of the voltage dividing circuit to reduce the first difference between the reference voltage and the feedback voltage, based on the comparison signal; and
a processor configured to:
enable the automatic trimming circuit and disable the DC-DC converter in a trimming mode;
enable the DC-DC converter and disable the automatic trimming circuit in an operating mode;
enable the DC-DC converter and disable the automatic trimming circuit in a verification mode; and
detect whether the internal voltage generating circuit is defective, based on a change in a logic state of the comparison signal in the verification mode
wherein the semiconductor integrated circuit applies a target voltage to the output pad in the trimming mode, and
wherein the feedback voltage applied to the comparator in the operating mode is obtained by dividing the internal voltage, and the feedback voltage applied to the comparator in the trimming mode is obtained by dividing the target voltage.

12. The semiconductor integrated circuit of claim 11, wherein the voltage dividing circuit comprises:
a serial string of resistance devices connected between the output pad and a ground terminal; and
switches respectively connected between nodes of the serial string of resistance devices and a feedback node, the switches being configured to be turned on based on the trimming signal, and
the comparator comprises:
a first input terminal configured to receive the reference voltage;
a second input terminal connected to the feedback node, the second input terminal being configured to receive the feedback voltage; and
an operation amplifier configured to generate the comparison signal, based on a voltage difference between the first input terminal and the second input terminal.

13. The semiconductor integrated circuit of claim 11, wherein the automatic trimming circuit is further configured to:
determine a final voltage dividing ratio of the voltage dividing circuit to be the first voltage dividing ratio corresponding to the trimming signal in response to the comparison signal changing from a first logic state to a second logic state; and
determine the final voltage dividing ratio to be a voltage dividing ratio corresponding to an (N−1)th trimming signal in response to the comparison signal changing from the second logic state to the first logic state, the trimming signal being an Nth trimming signal, and N being an integer of two or more.

14. The semiconductor integrated circuit of claim 11, wherein the processor is further configured to determine the internal voltage generating circuit as defective in response to the change in the logic state of the comparison signal not occurring in the verification mode during an initial set time period.

15. The semiconductor integrated circuit of claim 11, wherein the automatic trimming circuit is further configured to determine a final voltage dividing ratio of the voltage dividing circuit to be the first voltage dividing ratio corresponding to the trimming signal in response to the change in the logic state of the comparison signal.

16. An internal voltage trimming device comprising:
   a voltage dividing circuit configured to generate a feedback voltage, based on a resistance of the voltage dividing circuit and a target voltage that is received in a trimming mode;
   a comparator configured to compare a reference voltage and the feedback voltage to generate a comparison signal;
   a direct current to direct current (DC-DC) converter configured to generate an internal voltage, based on an input voltage and the comparison signal, and be disabled in the trimming mode;
   an automatic trimming circuit configured to generate, in the trimming mode, a trimming signal, based on the comparison signal,
   wherein the voltage dividing circuit is further configured to adjust the resistance, based on the trimming signal; and
   a processor configured to:
      enable the DC-DC converter and disable the automatic trimming circuit in a verification mode; and
      detect whether at least one among the voltage dividing circuit, the comparator, and the DC-DC converter is defective, based on a change in a logic state of the comparison signal in the verification mode.

17. The internal voltage trimming device of claim 16, wherein the automatic trimming circuit is further configured to generate the trimming signal to decrease the resistance in response to the comparison signal indicating that the reference voltage is lower than the feedback voltage.

18. The internal voltage trimming device of claim 16, wherein the automatic trimming circuit is further configured to generate the trimming signal to increase the resistance in response to the comparison signal indicating that the reference voltage is higher than the feedback voltage.

* * * * *